(12) United States Patent
Alwadi et al.

(10) Patent No.: US 12,298,897 B2
(45) Date of Patent: May 13, 2025

(54) ARCHITECTURAL SUPPORT FOR PERSISTENT APPLICATIONS

(71) Applicants: National Technology & Engineering Solutions of Sandia, LLC, Albuquerque, NM (US); University of Central Florida Research Foundation, Inc., Orlando, FL (US)

(72) Inventors: Mazen Alwadi, Irbid (JO); Vamsee Reddy Kommareddy, Leander, TX (US); Clayton Hughes, Albuquerque, NM (US); Simon David Hammond, Albuquerque, NM (US); Amro Awad, Morrisville, NC (US)

(73) Assignees: National Technology & Engineering Solutions of Sandia, LLC, Albuquerque, NM (US); University of Central Florida Research Foundation, Inc., Orlando, FL (US)

( * ) Notice: Subject to any disclaimer, the term of this patent is extended or adjusted under 35 U.S.C. 154(b) by 162 days.

(21) Appl. No.: 17/665,390

(22) Filed: Feb. 4, 2022

(65) Prior Publication Data

US 2023/0251963 A1 Aug. 10, 2023

(51) Int. Cl.
*G06F 12/02* (2006.01)
*G06F 8/65* (2018.01)

(52) U.S. Cl.
CPC ........... *G06F 12/0238* (2013.01); *G06F 8/65* (2013.01); *G06F 2212/304* (2013.01)

(58) Field of Classification Search
CPC ............ G06F 12/0238; G06F 12/0246; G06F 2212/202; G06F 2212/2022; G06F 3/061;
(Continued)

(56) References Cited

U.S. PATENT DOCUMENTS 8,924,629 B1 * 12/2014 Call .................... G06F 12/0246
711/103
9,335,937 B2 * 5/2016 Seo ........................ G06F 12/06
(Continued)

OTHER PUBLICATIONS

Write Through and Write Back in Cache by Aish 2020 (Year: 2020).*
(Continued)

*Primary Examiner* — Paul M Knight
(74) *Attorney, Agent, or Firm* — Yee & Associates, P.C.; Gregory M. Doudnikoff

(57) ABSTRACT

Illustrative embodiments are directed to methods, apparatus and computer program products for caching at least a fraction of data stored in a non-volatile memory in a mirror region of a dynamic random access memory. A memory controller hub of a processor chip coupled to both the non-volatile memory and the dynamic random access memory is configured to, when an update to the dynamic random access memory is cached in the mirror region of the dynamic random access memory, use the memory controller hub to write the update directly to the mirror region of the dynamic random access memory and concurrently mirror the update to the non-volatile memory to provide coherent persistent durability of the update. When a read from the dynamic random access memory is cached in the mirror region of the dynamic random access memory, embodiments can use the memory controller hub to serve the read directly from the mirror region of the dynamic random access memory to optimize read operations of persistent objects.

27 Claims, 8 Drawing Sheets

(58) Field of Classification Search
CPC .... G06F 3/0611; G06F 3/0613; G06F 3/0656; G06F 3/0685; G06F 3/0679

See application file for complete search history.

(56) References Cited

U.S. PATENT DOCUMENTS

| | | | |
|---|---|---|---|
| 10,180,792 B1 * | 1/2019 | Gaertner | G06F 11/1441 |
| 2007/0165443 A1 * | 7/2007 | Richardson | H04N 25/75 365/105 |
| 2009/0046501 A1 * | 2/2009 | Ranjan | G11C 11/1659 365/171 |
| 2011/0161560 A1 * | 6/2011 | Hutchison | G06F 12/0246 711/202 |
| 2013/0198439 A1 * | 8/2013 | Kurotsuchi | G06F 12/1009 711/103 |
| 2015/0347026 A1 * | 12/2015 | Thomas | G06F 12/0246 711/103 |
| 2016/0041917 A1 * | 2/2016 | Trojanowski | G06F 3/068 711/120 |
| 2017/0228191 A1 * | 8/2017 | Sun | G06F 3/0647 |
| 2018/0113875 A1 * | 4/2018 | Jain | G06F 16/1847 |
| 2018/0329651 A1 * | 11/2018 | Chang | G06F 3/0656 |
| 2018/0373450 A1 * | 12/2018 | Ji | G06F 12/00 |
| 2019/0384713 A1 * | 12/2019 | De | G06F 12/0888 |
| 2020/0012601 A1 * | 1/2020 | Jeong | G06F 3/0679 |
| 2020/0020360 A1 * | 1/2020 | Kosuru | G11C 16/10 |
| 2020/0089609 A1 * | 3/2020 | Colline | G06F 12/0246 |
| 2021/0056016 A1 * | 2/2021 | Bulusu | G06F 3/064 |
| 2021/0117094 A1 * | 4/2021 | Vankamamidi | G06F 3/0614 |
| 2021/0255920 A1 * | 8/2021 | Bernat | G06F 1/30 |
| 2022/0019547 A1 * | 1/2022 | Shih | G06F 12/1009 |
| 2022/0365707 A1 * | 11/2022 | Kachare | G06F 3/0679 |
| 2022/0413762 A1 * | 12/2022 | Pletka | G06F 3/0656 |

OTHER PUBLICATIONS

Stealth Persist Architectural Support for Persistent Applications by Alwadi Feb. 20, 2021 (Year: 2021).*

Towards Efficient NVDIMM based Heterogeneous Storage by Chen 2019 (Year: 2019).*

Mirror Making Lock Free Data Structures Persistent by Friedman 2021 (Year: 2021).*

Intels Optane Two Confusing Modes by Handy 2019 (Year: 2019).*

MEDAL Scalable DIMM by Huangfu 2019 (Year: 2019).*

What is NVDIMM TechTarget by Kranz 2017 (Year: 2017).*

Transactional Database Performance Boosted with Intel Optane by Ogle 2020 (Year: 2020).*

Improving Bank Level Parallelism for Irregular Applications by Tang 2016 (Year: 2016).*

The Multi-Queue Replacement Algorithm by Zhou 2001 (Year: 2001).*

Page Placement in Hybrid Memory Systems by Ramos (Year: 2011).*

Stealth-Persist: Architectural Support for Persistent Applications in Hybrid Memory Systems by Alwadi (published less than one year before filing by inventors named in this application) (Year: 2021).*

Alwadi, M. et al., "Stealth-Persist: Architectural Support for Persistent Applications in Hybrid Memory Systems," presented at the 27th IEEE International Symposium on High-Performance Computer Architecture (HPCA-27) on Mar. 1, 2021, 14 pages.

* cited by examiner

ARCHITECTURAL SUPPORT FOR PERSISTENT APPLICATIONS

GOVERNMENT LICENSE RIGHTS

This invention was made with Government support under Contract No. DE-NA0003525 awarded by the United States Department of Energy/National Nuclear Security Administration. The United States Government has certain rights in this invention.

BACKGROUND INFORMATION

1. Field

The present disclosure relates generally to architectural support for persistent applications in hybrid memory systems. More particularly, illustrative embodiments are directed to systems, methods, and computer program products where a memory controller hub mirrors dynamic random access writes to a non-volatile memory concurrently to provide coherent durability of writes while reading directly from the dynamic random access memory.

2. Background

Emerging non-volatile memories (NVMs) are maturing up to a level close to mass production stage and wide adoption. For instance, very recently, Intel released the Optane DC product, which is a memory module that uses 3D XPoint technology. These NVM-based memory modules operate at ultra-low idle power but still have very high densities. For example, each Optane DC module can have 512 GB of capacity. Therefore, they present a very compelling addition to servers where high memory capacities are needed but may be power constrained. While DRAM modules must perform frequent, costly, refresh operations, NVMs do not, which eliminates a large percentage of the power consumption. Additionally, NVMs retain data after power failure or shutdown, making them very useful for crash-consistent applications and hosting fast access filesystems. However, the read and write latencies of emerging NVMs are multiple times slower than those of DRAM. For instance, on Intel's Optane DC, the read latency is 300 ns, whereas DRAM has read latency close to 70 ns—a 4.3× slower read accesses. While write latencies of NVMs can be hidden through external buffering or by leveraging battery-backed internal write buffers (e.g., Intel's Write Pending Queue), the device write latencies of NVMs can be tens of times slower than those of DRAM.

The persistence feature of emerging NVMs, is attractive for many applications where data recovery and crash consistency are critical. Moreover, emerging NVMs allow direct access and updates to persistent files without incurring expensive page faults. For example, databases of hundreds of gigabytes can reside on NVM, and can be read and written directly through applications with conventional load/store operations, similar to DRAM. Moreover, Intel's Persistent Memory Development Kit (PMDK) allows developing applications that leverage NVM's persistence to make durable updates for critical data structures. Ideally, after a crash, persistent applications should be able to recover by reading their data structures from the NVM. However, the high read/write latency of NVMs can significantly slow down accesses to such persistent data. In other words, persistent applications need to choose between using the slow (relative to DRAM) NVM that enables crash consistency, or using DRAM and lose the persistence capabilities in the memory subsystem. With the increasing adoption of emerging NVMs, along with the increasing accessibility of persistent programming libraries (e.g., PMDK), more and more applications may utilize the persistence feature of NVMs. Therefore, improving the performance of such applications while still ensuring persistence of data is a crucial design point.

Emerging NVMs can be integrated as storage devices (e.g., inside Solid-State Drives), such as Intel's Optane Drive or as part of the system's memory hierarchy. For integrating NVMs into the memory hierarchy, there are several standards and options. Most notably, Intel's DIMM-like NVM modules can be integrated either as the main memory, or as a part of the main memory along with other memory options (e.g. DRAM and HBM). When used as a part of the main memory, it can be exposed as a separate physical memory address range extending the physical address range of DRAM, or the DRAM can be used as a hardware-managed cache of the physical range of the Optane DC. The former is called application direct mode, which is similar to exposing different memory zones to the system in Non-Uniform Memory Architectures (NUMA), whereas the latter is called memory mode. Memory mode gives up on the persistence feature, as memory blocks could be updated in the volatile DRAM when applications flush their updates from internal caches. However, since DRAM caches a large number of the NVM pages, it significantly improves the access latency, especially for frequently-used pages. On the other hand, application direct mode ensures persistence of pages mapped to the NVM address range, but incurs significant latencies as it relies on the capacity-limited internal processor caches (not the external DRAM). Therefore, the current integration options for Optane memory modules as (part of) the main memory ignores the performance of persistent applications that require both persistence and high performance (e.g., cacheability in DRAM).

JEDEC also provides several standards for memory modules containing NVMs. In particular, JEDEC defines three different standards for DIMMs containing NVMs (called NVDIMM), namely NVDIMM-N, NVDIMM-P, and NVDIMM-F. The three different options provide different exposed capacity, persistency guarantees, and management complexity trade-offs. In particular, NVDIMM-N only exposes the DRAM to the software and utilizes a supercapacitor to power the DIMM during a crash, providing the capability to copy DRAM data to the NVM (currently flash-based). Therefore, NVDIMM-N has exposed latencies similar to DRAM but limits the memory capacity to the DRAM size. NVDIMM-F exposes the NVM (currently flash-based) to the software and is accessed directly as a block device. Meanwhile, NVDIMM-P is more broadly defined for different NVM technologies and allows internal DRAM caching within the NVDIMM-P with several persistence options, such as deep flush commands in case the NVDIMM-P is not energy-backed. One main advantage of NVDIMM-P is that it leverages a transaction protocol, which allows it to use non-deterministic timing as opposed to NVDIMM-N and NVDIMM-F that rely on deterministic timing. Clearly, among the three options, NVDIMM-P is the most suitable for emerging NVMs (not tailored for flash) and high capacity systems. Moreover, with sufficient energy-backing on the DIMM, the internal DRAM can be thought of as a persistent fast cache of NVM inside the NVDIMM-P module. NVDIMM-P, without energy-backing, is similar to using Intel's Optane DC in memory mode except that the DRAM cache is inside the NVDIMM-P, not independent module as in memory mode.

Recently, a lot of work has explored how to improve the performance of hybrid memory systems. For instance, a scheme for page placement in hybrid memory systems. The proposed scheme uses a multi-queue to rank the pages and only migrates the performance-critical pages to the DRAM. However, the scheme does not ensure data persistency and is only focused on placing the performance-critical pages in the DRAM. HetroOs proposed an application transparent scheme that exploits the application's memory usage information, provided by the operating system, to decide where to place the data in heterogeneous memory systems. However, the motivation in HetroOs is purely for system performance and does not provide persistency guarantees. Therefore, applications with persistency requirements would still have to suffer high NVM latency. Nimble proposed a scheme that reuses the operating system's page tracking structures to tier pages between memories. Additionally, Nimble provides several optimizations such as transparent huge page migration and multi-threaded page migration, which leads to 40% performance improvement compared to the native Linux system. However, Nimble improves page migration between memories and does not ensure the data persistency. Others proposed a page placement scheme for GPUs in hybrid memory systems. However, the proposed scheme migrates pages between memories based on the application bandwidth requirements, which does not consider the data persistency. Others devised a policy that enables DRAM to cache pages with a high frequency of row buffer misses in the NVM memory. Others discussed the possible relaxations to maximize overall memory bandwidth. The proposed techniques rely on the compiler support or Linux kernel to detect pages of interest. Migrating remote pages to the local memory in disaggregated memory systems is explored.

Ensuring the persistency, performance, and crash consistency of NVM resident data has been under the spotlight recently. Another improves the persistent applications write latency by decomposing the back-end memory operations into smaller sup-operations, then overlapping the sup-operations. Besides the NVM libraries mentioned earlier, Intel's PMDK, REWIND, NV-Heaps and LSNVMM provide software based high level interface for the programmers to ensure the data persistency and provide crash consistency support. Hardware based approaches provide consistency using transactions and low-level primitives. The proposed scheme, Stealth-Persist optimizes persistent workloads read operations in hybrid memories and is orthogonal with the previous approaches.

Therefore, it would be desirable to have systems, methods and products that consider at least some of the issues discussed above, as well as other possible issues.

SUMMARY

The illustrative embodiments provide methods of architectural support of hybrid memory system persistent applications, the method comprising: caching at least a fraction of data stored in a non-volatile memory in a mirror region of a dynamic random access memory, wherein a memory controller hub of a processor chip coupled to both the non-volatile memory and the dynamic random access memory is configured to, when an update to the dynamic random access memory is cached in the mirror region of the dynamic random access memory using the memory controller hub to write the update directly to the mirror region of the dynamic random access memory and concurrently mirror the update to the non-volatile memory to provide coherent persistent durability of the update. When a read from the dynamic random access memory is cached in the mirror region of the dynamic random access memory, embodiment can use the memory controller hub to serve the read directly from the mirror region of the dynamic random access memory to optimize read operations of persistent objects.

The illustrative embodiments also provide apparatus for architectural support of hybrid memory system persistent applications, the apparatus comprising: a processor chip comprising a core, a cache and a memory controller hub; a non-volatile memory coupled to the processor chip; and a dynamic random access memory coupled to the processor chip, the dynamic random access memory comprising a mirror mapping table and a mirror region, wherein the dynamic random access memory caches at least fraction of data stored in the non-volatile memory in the mirror region of the dynamic random access memory, and wherein the memory controller hub is configured to, when an update to the dynamic random access memory is cached in the mirror region of the dynamic random access memory using the memory controller hub to write the update directly to the mirror region of the dynamic random access memory and concurrently mirror the update to the non-volatile memory to provide coherent persistent durability of the update. When a read from the dynamic random access memory is cached in the mirror region of the dynamic random access memory, embodiments can use the memory controller hub to serve the read directly from the mirror region of the dynamic random access memory to optimize read operations of persistent objects.

The illustrative embodiments also provide computer program products for architectural support of hybrid memory system persistent applications, the computer program product comprising: a non-transitory computer readable storage media; and program code, stored on the computer readable storage media, for caching at least a fraction of data stored in a non-volatile memory in a mirror region of a dynamic random access memory, wherein a memory controller hub of a processor chip coupled to both the non-volatile memory and the dynamic random access memory is configured to, when an update to the dynamic random access memory is cached in the mirror region of the dynamic random access memory, use the memory controller hub to write the update directly to the mirror region of the dynamic random access memory and concurrently mirror the update to the non-volatile memory to provide coherent persistent durability of the update. When a read from the dynamic random access memory is cached in the mirror region of the dynamic random access memory, embodiments can use the memory controller hub to serve the read directly from the mirror region of the dynamic random access memory to optimize read operations of persistent objects.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
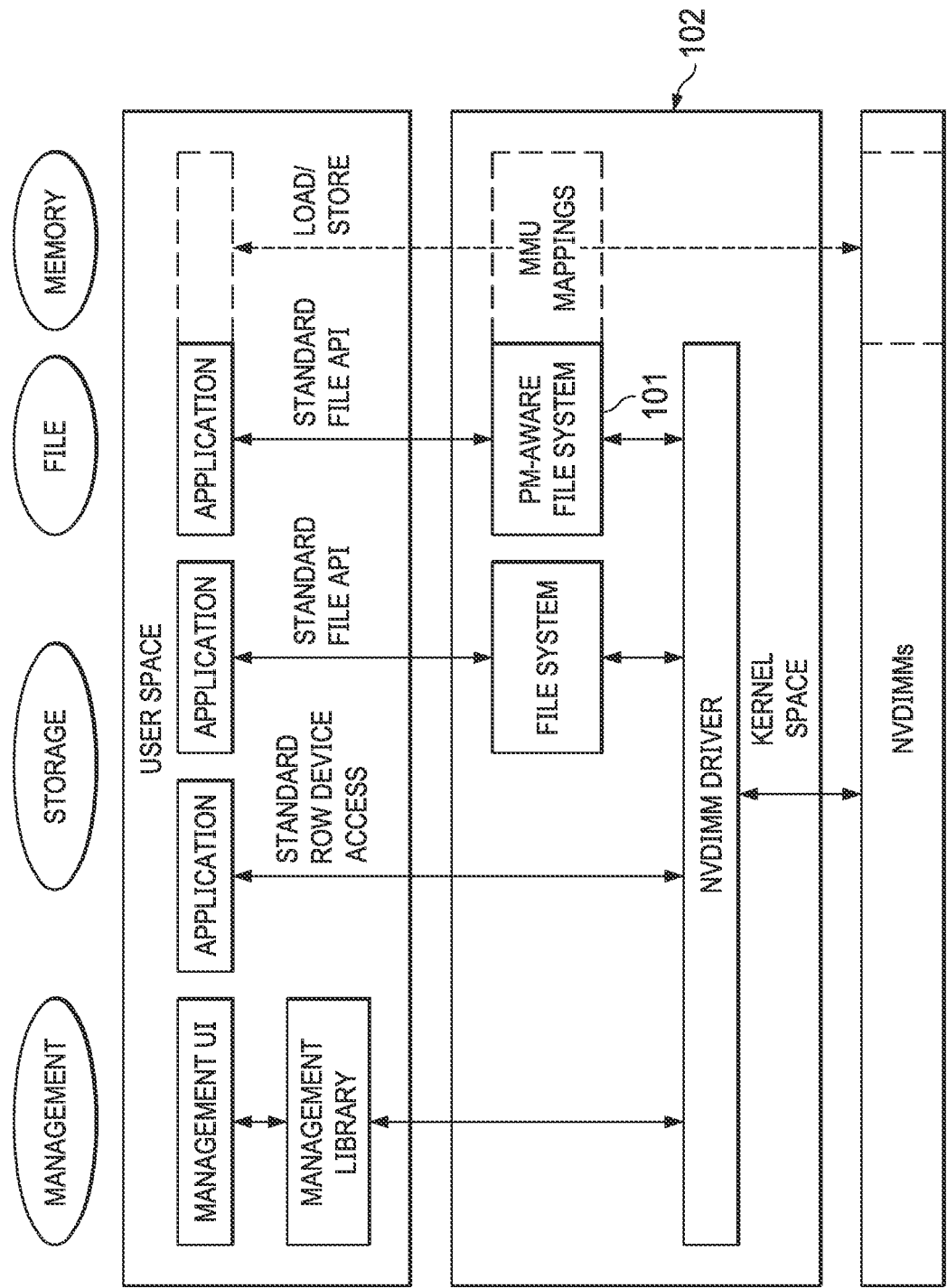
FIG. 1 is an illustration of a block diagram of a persistent memory aware file system, appropriately labeled "PRIOR ART;"

Non-volatile memories (NVMs) have the characteristics of both traditional storage systems (persistent) and traditional memory systems (byte-addressable). However, they suffer from high write latency and have a limited write endurance. Researchers have proposed hybrid memory systems that combine DRAM and NVM, utilizing the lower latency of the DRAM to hide some of the shortcomings of the NVM—improving system's performance by caching resident NVM data in the DRAM. However, this can nullify the persistency of the cached pages, leading to a question of trade-offs in terms of performance and reliability. Embodiments of this disclosure can include Stealth-Persist, a novel architecture support feature that allows applications that need persistence to run in the DRAM while maintaining the persistency features provided by the NVM. Stealth-Persist creates the illusion of a persistent memory for the application to use, while utilizing the DRAM for performance optimizations. Experimental results show that Stealth-Persist improves the performance by 42.02% for persistent applications.

While NVDIMM-P is interesting as a concept, the fast and persistent caching capability for large NVM capacity is limited due to the following reasons. First, if tens or hundreds of gigabytes of DRAM is needed to efficiently cache large NVMs, then bulky and potentially expensive battery support is needed to provide energy-backing. Moreover, with the energy-backing only supporting the internal DRAM, customers are limited to the same vendor and the specific capacities of DRAM cache available in NVDIMM-P. Alternatively, leveraging memory mode with independent NVM and DRAM modules solves the flexibility limitation of NVDIMM-P, but expensive and environmentally unfriendly (and bulky) battery backing is needed. In other words, leveraging DRAM as a fast persistent cache of NVM is limited by energy-backing (or residual energy) capabilities, however such capabilities need to be further boosted when large DRAM modules are needed. Therefore, a goal of embodiments of this disclosure can be to allow very fast persistent caching of NVMs but without the need for any additional energy-backed capabilities to flush the DRAM cache content to NVM. Thus, embodiments of this disclosure enable the integration of preferred DRAM modules in systems with NVMs while also allow caching of persistent data in DRAM, without sacrificing persistence or requiring additional battery-backing capabilities.

To enable fast persistent DRAM caching of NVM, embodiments of this disclosure can include a novel memory controller design that leverages selective NVM mirroring for persistent pages cached in DRAM. Embodiments of this disclosure can support both memory mode and application direct mode, and transparently ensure durability of updates to persistent pages cached in DRAM. In particular, the memory controller hub can support both memory mode and application direct mode. Moreover, the memory controller of embodiments of this disclosure can minimize the number of writes to NVMs by relaxing the mirroring of DRAM cached pages' updates if their source pages in NVMs are in the logically non-persistent part of NVM (i.e., used for hosting pages that do not need to be persisted). Similar to memory mode support in current processors, the memory controller of embodiments of this disclosure can transparently migrate pages between NVM and DRAM. However, embodiments of this disclosure can ensure persistence of DRAM cached pages by inferring their semantic from their original address in NVM. Embodiments of this disclosure only incur additional writes to DRAM if the page is cached there, in addition to the NVM write which would have occurred anyway. However, future reads will be served from DRAM, which enables fast and persistent caching of durable NVM pages. Additionally, by allowing persistent pages to be located in DRAM, embodiments of this disclosure can leverage additional bank-level parallelism for accessing persistent pages, instead of forcing all accesses to NVM. Embodiments of this disclosure can involve novel optimizations and design considerations due to the nature of writes and how DRAM is exposed to the system (memory mode or application direct mode). While all prior work on persistent applications explored optimizations for writing to persistent objects, this is the first work to explore optimizing the read operations of persistent objects.

To evaluate embodiments of this disclosure, persistent applications from the Whisper benchmark suite can be used. To study the robustness of embodiments of this disclosure, 6 memory intensive benchmarks were developed, similar to previous work. An open-source architectural simulator, Structural Simulation Toolkit (SST) is used to simulate embodiments of this disclosure. On average, embodiments of this disclosure can provide a 42.02% performance improvement and 88.28% reduction in NVM reads when compared to only using NVM for persistent applications. Note that using NVM-only for persistent data is the only option that allows data persistence without any backup battery and is thus used as a baseline.

In summary, embodiments of this disclosure can include following contributions:

Embodiments of this disclosure can include Stealth-Persist, a novel hardware support to improve the performance of persistent applications by enabling DRAM caching of the hot persistent pages in DRAM while ensuring the data persistency, without the need of external power backing, and software-transparently.

Stealth-Persist can be integrated with vertical and horizontal implementations of hybrid DRAM-NVM main memory systems.

Embodiments of this disclosure can include several design options for Stealth-Persist, that provide trade-offs between the performance and the number of mirrored pages.

Embodiments of this disclosure were extensively analyzed for overheads for different region sizes, different replacement policies, and different mirroring threshold.

Emerging Non-Volatile Memories

Emerging NVMs such as 3D XPoint and Intel's Optane DC feature higher density, byte addressability, lower cost per bit, lower idle power consumption than DRAM, and non-volatility, but have higher access latency and limited write endurance. Due to the non-volatility feature, they can be used as a storage to host filesystem, or as a memory either persistent or non-persistent. For instance, NVM-based DIMMs can be used to hold files and memory pages, which can be accessed using regular load/store operations. To realize this type of accesses, recent operating systems (OSes) started to support configuring the memory as persistent or conventional non-persistent through the DAX filesystems. In DAX filesystems, a file can be directly memory-mapped and accessed using regular load/store operations without copying its content to the page cache. However, NVM's access latency is 3-4× slower than the DRAM's access latency. Therefore, researchers proposed to build memory systems that have both NVM and DRAM portions.

Hybrid Main Memory (HMM)

Hybrid main memory (HMM) systems are expected to have a large NVM portion due to its density and ultra-low idle power, and a small DRAM portion due to its fast read/write operations. HMM can be deployed in two different schemes, horizontally or vertically. In the vertical scheme, the NVM is connected as a new memory tier and the DRAM is used to cache the NVM's data. This scheme allows faster access to the large memory pool (NVM), and requires a special hardware to migrate data from the NVM to the DRAM, e.g., the caching of cachelines is handled by Intel's Xeon scalable processor's memory controller in Intel's Optane DC memory mode. However, such a scheme does not provide persistency due to the DRAM's volatility. In the second approach, a horizontal implementation of the HMM system exposes both the NVM and the DRAM to the physical address space, as in NVDIMM-P and Optane DC's application direct mode, and relies on the OS to handle data accesses and page migrations if required. In both cases, a hybrid memory management scheme is required to manage different persistency and performance requirements.

Different hybrid memory management schemes have been proposed in the literature based on the memory hierarchy. Schemes proposed software solutions to detect which pages to migrate to the fastest memory (e.g., DRAM). These schemes work with a horizontal implementation of hybrid memory systems when both DRAM and NVM are memory mapped and exposed to the OS. On the other hand, vertical implementation of hybrid memory systems uses the DRAM as a cache. Therefore, the DRAM is not exposed to the OS, wherein caching pages is handled using dedicated hardware, typically an extension of the memory controller as in Intel's Optane DC memory mode. Schemes rank the pages based on how frequently each page is accessed using a Multi-Queue (MQ) structure, then use the pages' ranks to decide which pages to migrate to the DRAM and which pages to keep in the NVM. However, tracking all the pages and checking the MQ structure to promote and demote pages entails high overheads, therefore only the head of the queue is checked in each epoch.

After discussing the hybrid memory system's management schemes, some of the used schemes for page caching in HMM are described.

Page Caching Policy

The page caching policy is used to determine which pages should be cached in the DRAM, if used to cache the NVM pages. In this section, two policies that embodiments of this disclosure can include are discussed.

First touch policy: This policy caches the pages on the first access and selects a page for eviction based on the LRU (least recently used) algorithm.

Multi-Queue (MQ): The MQ was originally designed to rank disk blocks, and later used for page placement in hybrid memory systems. The MQ works as follows: MQ defines M LRU queues of block descriptors. The queues are numbered from 0 to M−1, with blocks at queue M−1 are the most accessed blocks. Each descriptor contains the block's number, a reference counter, and a logical expiration time. On the first access to a block, its descriptor is placed in the tail of queue 0, and its expiration time is updated to CurrentTime+LifeTime. Both times are measured in the number of accesses, and the LifeTime represents the number of consecutive accesses to different blocks before the block is expired. Every time the block is accessed, its expiration time is reset to CurrentTime+LifeTime, its reference counter is incremented, and its descriptor is pushed to the tail of its current queue. After a certain number of accesses to the block's descriptor in queue i, it gets promoted to queue i+1 saturating in queue M−1. On the other hand, blocks that have not been accessed recently get demoted. On each access, descriptors at the heads of all queues are checked for expiration. If the descriptor is expired, it is placed in the tail of the below queue and has its lifetime reset, and its demotion flag is set. If a descriptor receives two consecutive demotions, the descriptor is removed from the MQ structure. In order to reduce the overhead of promotion/demotion, these operations are only performed at the end of each epoch.

As it has been proven that MQ is superior to other algorithms in selecting pages to replace, embodiments of this disclosure can use it, as it facilitates detecting the performance critical pages. Thus, embodiments of this disclosure can include the MQ design. After discussing the caching policies, the currently available industrial implementations of hybrid memory systems are mentioned.

Current Industrial HMM Systems

Currently, there are different types of HMM systems available in the market. For instance, JEDEC defines three different standards for HMM known as NVDIMM. NVDIMM types have different characteristics, persistency, and performance features. Moreover, Intel recently revealed details about the memory mode and application direct mode for the Optane DC.

NVDIMM-N contains a DRAM portion, a NVM portion, and a super capacitor. The system uses the DRAM in normal execution, and the NVM is only used to copy the DRAM data using the super capacitor power during crashes.

NVDIMM-F module is a NVM attached to the DDR bus, the access latencies of which is relatively higher than the DRAM. Thus, a DRAM can be installed in the system and used to cache the NVDIMM-F data at the cost of data persistency.

NVDIMM-P is still a proposal for a DIMM that have memory mapped DRAM and NVM, wherein the software places the data either on NVM or in DRAM, based on the size and the persistency requirements.

Optane DC Memory Mode is an operating mode of Intel's persistent memory, which is similar to the vertical implementation of the HMM. The NVM is used as the system's main memory, and the DRAM is used to cache the NVM's content. This mode provides access to a large memory with access latencies close to DRAM, but does not provide persistency.

Optane DC Application Direct Mode is an operating mode of Intel's persistent memory, which is similar to the NVDIMM-P.

Persistent Memory Programming Model

Due to the persistency feature of NVMs, accessing an NVM memory object is like accessing a storage file. Thus, applications need a way to re-connect to previously allocated memory objects. Therefore, persistent memory regions need names and access control to be accessed. Storage Networking Industry Association (SNIA) recommended OSes to provide standard file semantics for naming, permissions, and memory mappings. Thus, Direct-Access (DAX) support for filesystems was added by several OSes. DAX allows the application to directly use the persistent memory without using the system's page cache. FIG. 1 shows how persistent memory aware filesystem 101 in a kernel space 102 works.

Figure 2:
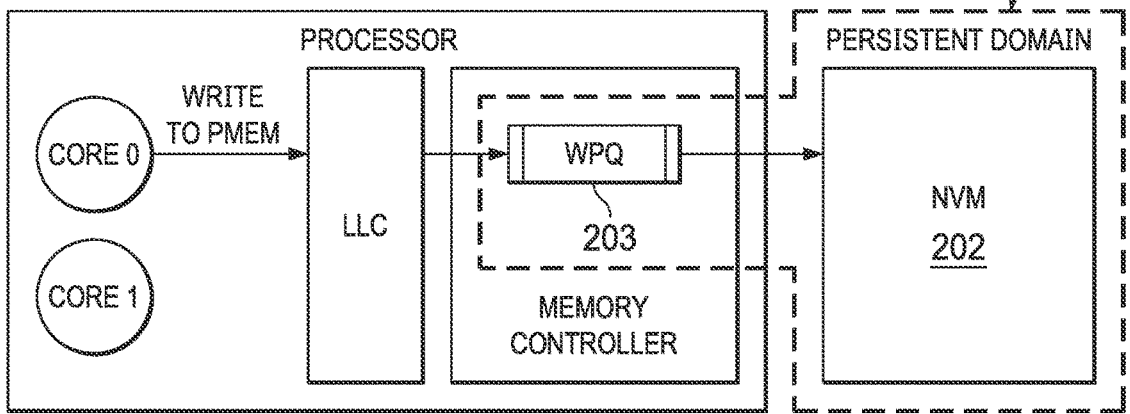
FIG. 2 is an illustration of a block diagram of a persistent domain in the context of a system with a persistent memory, appropriately labeled "PRIOR ART;"

Using persistent memory (PM) objects requires the programmer to consider multiple issues to ensure the data persistency and consistency. One of these issues is atomicity; what kind of support is provided by the hardware, and what is left for the software to handle. Intel's hardware ensures the atomicity for 8-byte writes, thus if an object is larger than 8 bytes, it is the software's responsibility to ensure the atomicity of updating the object. Moreover, ensuring data persistency requires pushing the data all the way to the persistent domain, as most of the data updates are done in the volatile processor caches. The persistent domain starts with the Write Pending Queue (WPQ), which is a small buffer in the memory controller. The WPQ is supported by the Asynchronous DRAM (ADR) refresh feature. The power provided by the ADR ensures flushing the WPQ content to the NVM in case of power failure. FIG. 2 shows the persistent domain 201 including an NVM 202, coupled to a WPQ 203 in a system with persistent memory.

```
[language=C, caption=NVM programming example, label=code]
// a, a_end in PM
a[0] = foo( );              // store foo( ) in a[0]
msync(&(a[0]), . . .);      // sync to PM
a_end = 0;                  // store 0 in a_end
msync(&a_end, . . .);       // sync to PM
. . .
n = a_end + 1;              // store a_end+1 in n
a[n] = foo( );              // store foo( ) in a[n]
msync(&(a[n]), . . .);      // / sync a[n]
a_end = n;                  // store n in a_end
msync(&a_end, . . .);       // sync to PM
```

In order to flush the data all the way to the persistent region, ensure atomicity, and ordering, a set of specific instructions need to be followed. The cost listing above shows a code example taken from SNIA NVM Programming Model V1.2. The code shows the persistent objects a and a_end. To ensure the persistency, atomicity, and ordering of updates to these persistent objects, msync operation is called each time one of these persistent objects is updated. Note that the update at line 7 was not followed by the msync operation as it is not updating a persistent object. The msync operation is used to force the updates of a memory range into the persistent domain. Moreover, it creates a barrier to guarantee that previous stores are performed before proceeding, fsync operation does the same functionality for files.

Motivation

Having a persistent portion of the main memory enables applications with different persistency requirements. However, to ensure the data persistency, application's persistent data should be placed in the NVM 202 portion of the memory, which hinders the performance of these applications, due to the slow access latencies of NVM. On the other hand, placing the application's data on the DRAM, will lead to better performance but fails to meet the data persistency requirement of such applications. To ensure the application's data persistency, persistent applications should follow the programming model mentioned in the Persistent Memory Programming Model section above. As discussed earlier, available persistent memory technologies either provide small memory capacity but fast and battery-backed DRAM-based persistent region, or high-capacity NVM (no need for battery backup) but slow persistent region. The former requires system's support, bulky items, and can limit the size of persistent DRAM depending on the size of the ultra-capacitor or battery. Moreover, it requires certain DIMM changes to support backup mode. Meanwhile, the latter incurs significant performance degradation due to the slow read accesses of persistent objects. While the size of persistent application's data is unlikely to fit in the volatile caches, caching such persistent data in the much larger DRAM can provide significant read speed-ups for persistent objects. Meanwhile, expecting battery-backup, limited DRAM size, and limiting the options (e.g., vendor) of DRAM modules to be integrated in the system, are major drawbacks for the available solutions. Thus, it is important to support caching of persistent data objects in DRAM by just relying on minor changes to the processor chip.

TABLE I

Technologies comparison.

| Technology | High persistent capacity | Persistent region performance | Flexibility |
|---|---|---|---|
| NVDIMM-N | X | yes | X |
| NVDIMM-P | yes | X | X |
| Optane DC memory mode | X (none) | X (none) | yes |
| Optane DC app direct mode | yes | X | yes |
| Stealth-Persist | yes | yes | yes |

Figure 3:
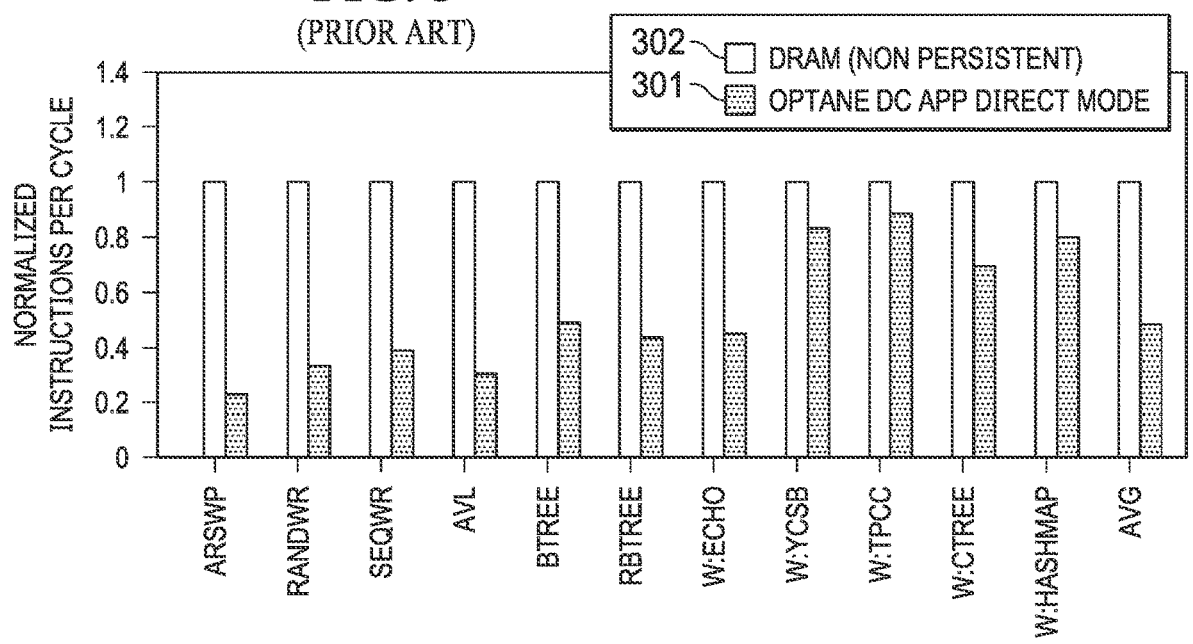
FIG. 3 is an illustration of normalized performance of persistent application with DRAM and Optane DC app direct mode with respect to DRAM, appropriately labeled "PRIOR ART;"

Table I compares between the available technologies. From Table I, it can be observed that the gap between supporting high-performance persistent memory, and high-capacity persistent memory, and hence Stealth-Persist aims to bridge this gap. FIG. 3 shows the performance overheads for persistent applications running on Optane DC app direct mode 301 (all persistent data is in NVM), compared to running on a system with DRAM 302 that does not provide data persistency. From FIG. 3, it can be observed that applications running on Optane DC's app direct mode incur an average of 2.04× slowdown.

Design

In this section, embodiments of Stealth-Persist's design are discussed in light of possible design options and their trade-offs. First, the design requirements, and the potential design options are discussed.

Design Requirements

Embodiments of this disclosure should meet the requirements necessary to allow wide adoption and high-performance, while preserving the semantics of persistent objects. In summary, the requirements are as following:

Flexibility: embodiments of this disclosure should allow the integration of any DRAM module, regardless of its capacity, in an NVM-equipped system, without requiring any special battery back-ups or specific DIMM modifications.

Persistency: any memory page or object that is supposed to be persistent (i.e., recoverable from crashes) should be recoverable without any extra battery backup support, regardless of where the page is located (NVM or DRAM).

High-Performance: accesses to persistent pages and objects should be as fast as accesses to DRAM.

Transparency: applications that leverage persistent memory for crash recovery should not need to explicitly manage caching and persisting of objects currently residing in DRAM.

To put these requirements in the context of persistent applications, consider a persistent application that accesses tens of gigabytes of persistent objects. Ideally, the system should be able to have DRAM modules integrated in addition to the NVM modules. Systems' owners should have the flexibility on what capacity and vendors to choose such DRAM and NVM modules from, which provides flexibility. However, updates to persistent objects should be durable and persistent across crashes, regardless of where they exist (DRAM or NVM). While updates to an object in the volatile caches are made durable through the persistency model and framework, i.e., clflushes and memory fences, there is no current support to guarantee the durability of persistent objects if they are cached in the off-chip DRAM, which brings us to the persistency requirement. Finally, the application should ideally have its persistent objects cacheable in DRAM to minimize the cost of fetching persistent objects that do not fit in the volatile processor caches, which are typically a few megabytes. The requirement to fetch off-chip persistent objects with a latency shorter than the slow NVM's latency (300 ns read latency vs 70 ns for DRAM) brings us to the third element of the design requirements, high-performance. Thus, persistent applications should be able to cache their persistent objects, which do not fit in the internal volatile caches, in the fast off-chip DRAM, while preserving their persistence capability. Finally, all operations for caching and persisting pages of persistent objects should happen transparently to the software, without exposing such details to the application, which brings us to the final requirement, transparency.

Design Options

One option is to support new instructions that do not commit until a cacheline is flushed—not only from volatile caches, but also from the off-chip DRAM, to the NVM. Such a design option can be realized by introducing new instructions to the instruction set architecture (ISA) with support from the memory controller, or by modifying the implementation of current instructions so that they flush cachelines from the internal volatile caches (e.g., clflush), as well as from the DRAM to the NVM. Assuming that the DRAM is operated as a hardware-managed cache for the NVM's data through the memory controller, such instructions would need to have the memory controller first check if the cacheline to be persisted is currently in the DRAM, read it, then flush it to the NVM. The main issues of this approach are: (1) it requires changes to the ISA, persistency programming libraries, and the processor core to support such new instructions. Additionally, (2) the latency to persist data will be significantly increased, especially if the flushed block is marked dirty in the DRAM. Note that even if the DRAM is caching pages instead of cachelines, it will still require similar support but with new instructions that operate at the page granularity, instead of clflush.

One another option is to leverage small, fixed size backup capability (e.g., ultra-capacitor) to power flushing a specific portion of the DRAM. For instance, sufficient power to flush 8 GB of DRAM, regardless of the total size of the module. The memory controller or the system's software can potentially migrate or place persistent pages in this subregion of the address space, marked as being persistent. When a power failure occurs, the memory controller (or external system circuitry) has sufficient power to flush that portion of the DRAM. While such a solution is similar in spirit to NVDIMM-N, it provides flexibility for choosing any DRAM module and capacity. However, the size of the portion has persistence support is limited to the backup capability of the system. On the other hand, such a solution requires external system support and limits the size of the persistent portion of the DRAM to the power backup capability. Again, such backup capabilities are typically costly, requires high area (bulky), and can be environmentally unfriendly.

While the first option provides high-performance, persistency and flexibility, it lacks the transparency. Meanwhile, the second option has partial flexibility (requires system support and possibly ISA changes), partially high-performance (only a small portion of DRAM can be used as persistent memory), transparency and persistency. Thus, embodiments of this disclosure should provide full transparency, high-performance, persistency, and flexibility, without any additional system support or backup capabilities beyond what is provided in modern systems.

Stealth-Persist Design

While meeting the aforementioned design requirements, embodiments of this disclosure should also be compatible with the different ways to integrate hybrid memory systems. In particular, vertical memory mode (e.g., memory mode of Optane DC) and horizontal memory mode (e.g., app direct mode of Optane DC).

Before delving into the details of Stealth-Persist support in different integration modes, how Stealth-Persist meets the design requirements will be described.

Figure 4A:
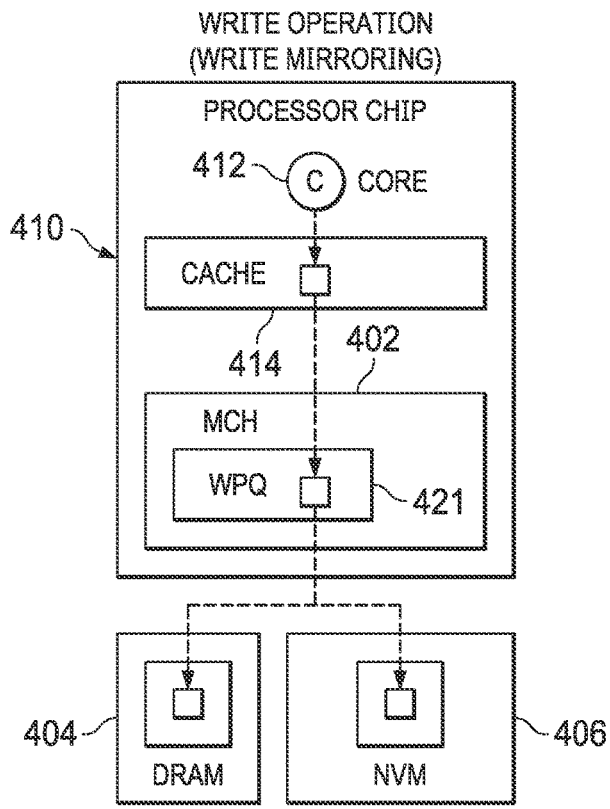
FIGS. 4A-4B are illustrations of block diagrams of read and write operations in stealth-persist (a) write operation while mirroring and (b) read operation in accordance with an illustrative embodiment.
Figure 4B:
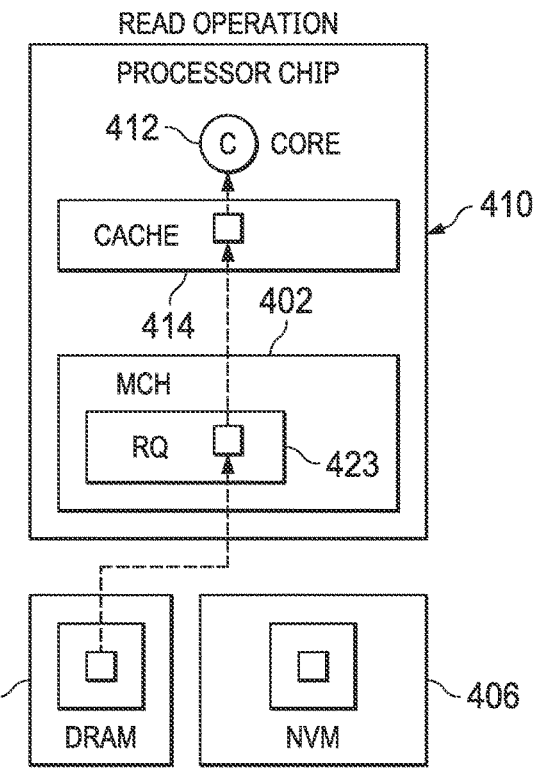

To meet the flexibility requirement, Stealth-Persist is implemented to support mirroring of updates to the persistent region to NVM when cached in DRAM. Thus, it does not require any support from the system and works with any DRAM size. By mirroring updates to persistent pages cached in DRAM, the persistency requirement is met. To make embodiments of this disclosure transparent to software, Stealth-Persist's mirroring operations occur at the memory controller and do not require any changes to the application or persistent programming library. Finally, to support high-performance access to persistent pages, embodiments of this disclosure can serve read requests to persistent objects from the DRAM, if cached there. FIGS. 4A-4B depict the read and write operations in Stealth-Persist, at a high-level.

As shown in FIGS. 4A-4B, the Memory Controller Hub (MCH) 402 handles mirroring of writes to persistent pages if cached in the DRAM 404, while serving read requests directly from the DRAM 404. By doing so, Stealth-Persist ensures the durability of writes to the NVM 406 while allowing fast read operations to such persistent objects.

In FIG. 4A, a processor chip 410 includes a core 412 C, a cache 414, and a memory controller hub (MCH) 402 having a write pending queue 421 WPQ. A non-volatile memory (NVM) 406 is coupled to the processor chip 410. A dynamic random access memory (DRAM) 404 is coupled to the processor chip 410. When an update (write) to the dynamic random access memory (DRAM) 404 is cached in the mirror region of the dynamic random access memory (DRAM) 404, the memory controller hub (MCH) 402 writes the update directly to the mirror region of the dynamic random access memory and concurrently mirrors the update to the non-volatile memory to provide coherent persistent durability of the update.

In FIG. 4B, a processor chip includes core C 412, cache 414, and memory controller hub (MCH) 402 having a read queue 423 RQ. Non-volatile memory (NVM) 406 is coupled to the processor chip 410. Dynamic random access memory (DRAM) 404 is coupled to the processor chip 410. When a read from the dynamic random access memory (DRAM) 404 is cached in the mirror region of the dynamic random access memory (DRAM) 404, the memory controller hub (MCH) 402, serves the read directly from the mirror region of the dynamic random access memory (DRAM) 404.

Many challenges and potential divergences arise when considering the context of hybrid memory systems. The first challenge is how to decide if a page should be mirrored or not. The second challenge is how to quickly identify if a page is cached in the DRAM 404 or not, and where it is cached in the DRAM 404, how to guarantee that both copies are coherent during run-time. Third, since not all pages in the NVM 406 need to be persisted, updates to pages stored in the NVM 406 need to be selectively mirrored. Finally, Stealth-Persist needs to be adapted to work with the myriad of ways to integrate hybrid memory systems. The following parts of this section discuss these challenges and how to overcome them.

Page Mirroring: Regardless of the HMM management scheme used, horizontal (e.g., application direct mode) or vertical (memory mode), Stealth-Persist requires a part of (or the whole) DRAM 404 to be used as a mirror region for persistent pages. In the vertical memory setup, the whole DRAM 404 will be used as a cache for NVM, and thus, any page cached in the DRAM 404 can be possibly mirrored to the NVM as well. Meanwhile, for the horizontal setup, since the DRAM 404 and the NVM 406 physical ranges are explicitly exposed to the system, the memory controller reserves a portion of the DRAM 404 to be used merely as a mirror region. The remaining part of the DRAM 404 will be exposed to the system directly as in app direct mode. Any persistent page located in the NVM 406 can be cached in the mirror region in the DRAM 404 regardless of the setup, i.e., the size of such region. On each memory access that targets a NVM address, embodiments of this disclosure need to transparently check if the page is currently resident in the DRAM 404. This check is needed for both read and write operations; read operations can be served directly from the DRAM 404, if the accessed page is cached there, whereas write operations need to update the copy in the NVM 406 to honor coherence between the mirrored page copies and ensure persistency. When a page is not present in the DRAM 404, embodiments of this disclosure need to read it (or write to it) from the NVM 406. Since the mirror region can be thought of as a buffer/cache for persistent pages in the NVM 406, embodiments of this disclosure need to define the insertion and evictions policies for said cache/buffer in DRAM 404.

For simplicity, embodiments of this disclosure can use a page insertion policy similar to what is used in vertical memory management schemes. By doing so, if memory mode is used, no changes are required to the management policy, except additional writes to the NVM 406 if persistent pages are cached in the DRAM 404. Meanwhile, for application direct mode, the defined mirror region in the DRAM 404 will be managed similar to the DRAM cache in memory mode, in addition to the mirroring writes to the NVM 406. With this in mind, embodiments of this disclosure can use two simple policies for page placement in the DRAM buffer: (1) first-touch policy (FTP) and (2) multi-queue (MQ) policy as proposed in prior work.

Figure 5A:
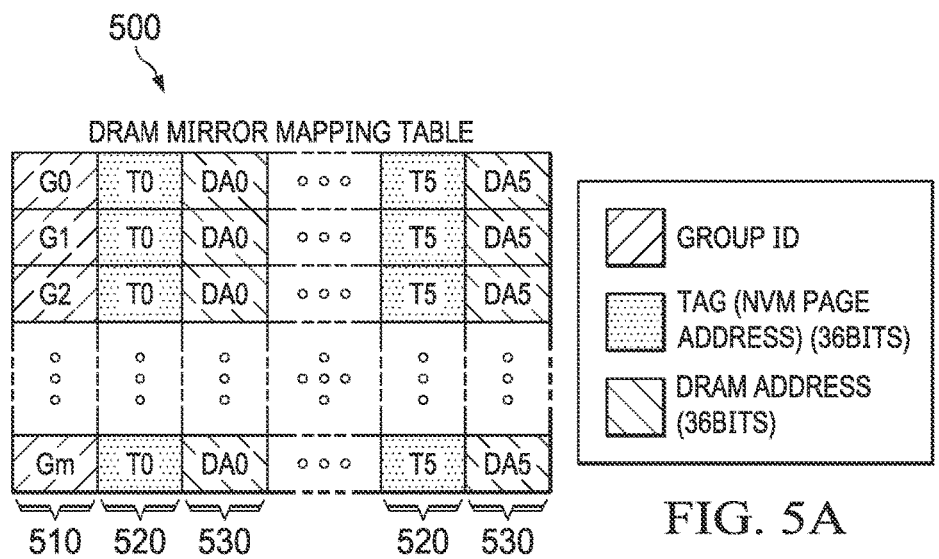
FIGS. 5A-5B are illustrations of block diagrams of a mirroring region mapping table (a) DRAM mirror mapping table (b) DRAM mirror mapping table cache in accordance with an illustrative embodiment.
Figure 5B:
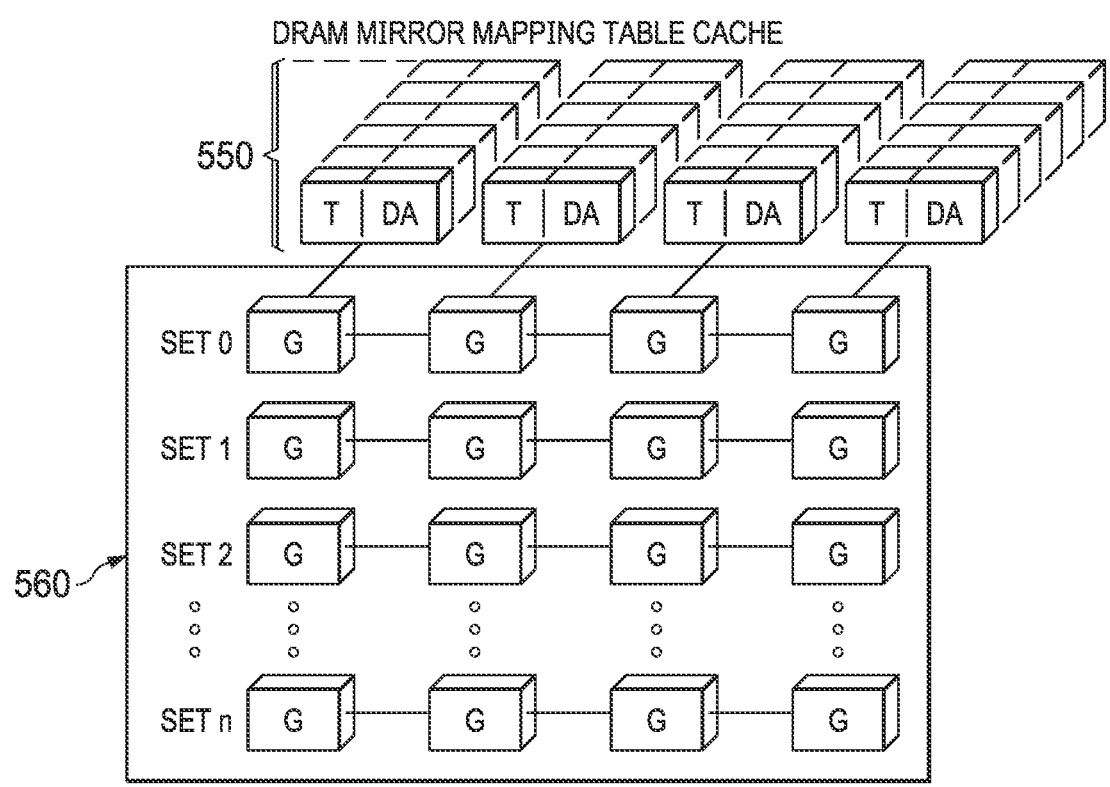

DRAM Mirror Region Lookup: To ensure Stealth-Persist can quickly check if a page is in the DRAM 404 (mirror region) or not, Stealth-Persist keeps track of the mirror region pages using a hardware managed table. The mirror's mapping table 500 contains the translations of the mirror's cached pages addresses, as shown in FIGS. 5A-5B. Each entry in the mapping table 500 contains a group ID 510 G, which is calculated using a modulus function of the mirrored page address in the NVM 406 over the number of pages in the mirror region. Additionally, each entry contains six pairs of translations that maps the 36-bit NVM's page address 520 T to the 36-bit mirror DRAM's page address DA 530. Additionally, embodiments of this disclosure can use 3 bits for each translation (18 bits total) as LRU (least recently used) bits for replacement policy in each entry, which makes a total of 450 bits for translations and the rest of the 512 bits are used for the group ID (32 bits) and padding. Thus, a page can be removed from the mirror region by either the clock replacement policy or by the LRU eviction within the entry.

Note that the storage requirement of the mirror's mapping table is 64 bytes for every 6 pages in the mirroring region. Therefore, embodiments of this disclosure can use a small cache in the memory controller to cache the mirror's mapping table entries while maintaining the table in the DRAM 404. Whenever a memory request to the persistent region is received, the group ID of the requested page is calculated and the mirror's mapping table cache 550 is checked for the requested group ID among plurality of sets of group IDs 560, which can result in three different scenarios. 1) The entry is cached, and the page is cached→the request is served from associated DRAM page. 2) The entry is cached, and the page is not cached, then (→) the page is not mirrored and the request is served from the NVM. 3) The entry is not cached, then (→) mapping table 500 in the DRAM 404 is to be checked to obtain the entry and its mirrored pages. Since a mapping table cache miss can lead to serving the request from the DRAM 404 with two accesses, or from the NVM 406 after checking the DRAM 404, embodiments of this disclosure can send the request to the DRAM 404 and the NVM 406 then serve the request from the DRAM 404, if the entry is in the table, or from the NVM 406 if it was not.

Coherent Updates to Mirrored Pages: In Stealth-Persist, coherence between the mirror region pages and the NVM pages should be maintained. Since persistent pages are expected to be recoverable, writes to persistent pages should be durable. Therefore, writes to the mirror region should be pushed to both memories. Stealth-Persist pushes the write requests to the mirror region pages into the DRAM's volatile write buffer and to the NVM's persistent WPQ. Note that a write request is only retired once it is placed in the WPQ, which ensures the write persistency. On the other hand, mirrored pages that belong to non-persistent region do not require data coherence nor recoverability, which is why Stealth-Persist implements selective mirroring.

Stealth-Persist does not have any impact on coherence. If the DRAM and the NVM modules are on the same socket, which is the configuration supported for Intel's DC PMM, coherence between the NVM and DRAM copy is managed by the MC through mirroring, whereas coherence with internal processor caches is handled in conventional systems. However, when an embodiments of this disclosure deviates from the current standard of having the NVM and the DRAM on the same socket, i.e., each is on a different socket, then embodiments of this disclosure can designate the memory controller near the NVM as the master, and thus it will be responsible to handle mirroring, remapping, etc., and accordingly forward any requests that hit in the mirror table cache to the memory controller in the socket has the DRAM module.

Selective Mirroring

Stealth-Persist implements selective mirroring techniques to reduce the number of writes to the NVM, which can be done by committing the writes directed to the non-persistent region to its DRAM mirrored version only. Stealth-Persist implements selective mirroring in the vertical HMM implementation just as in the Optane DC's memory mode, and in the horizontal HMM implementation as in the Optane DC's app direct mode. In both cases, Stealth-Persist requires the address range of the persistent memory region, which can be passed to Stealth-Persist by the kernel during system bring-up—for example, the Linux command memmap=2G!8G could be used to reserve a 2 GB persistent region starting at address 8G. Note that forwarding the writes of the pages in the non-persistent region to its mirrored version only, violates the coherency of these pages. However, since the pages are in the non-persistent region, and these applications are not expected to be recoverable, the writes can be committed to the mirrored page only, while the whole page will be written back to the NVM if the page gets evicted.

Overall

Figure 6:
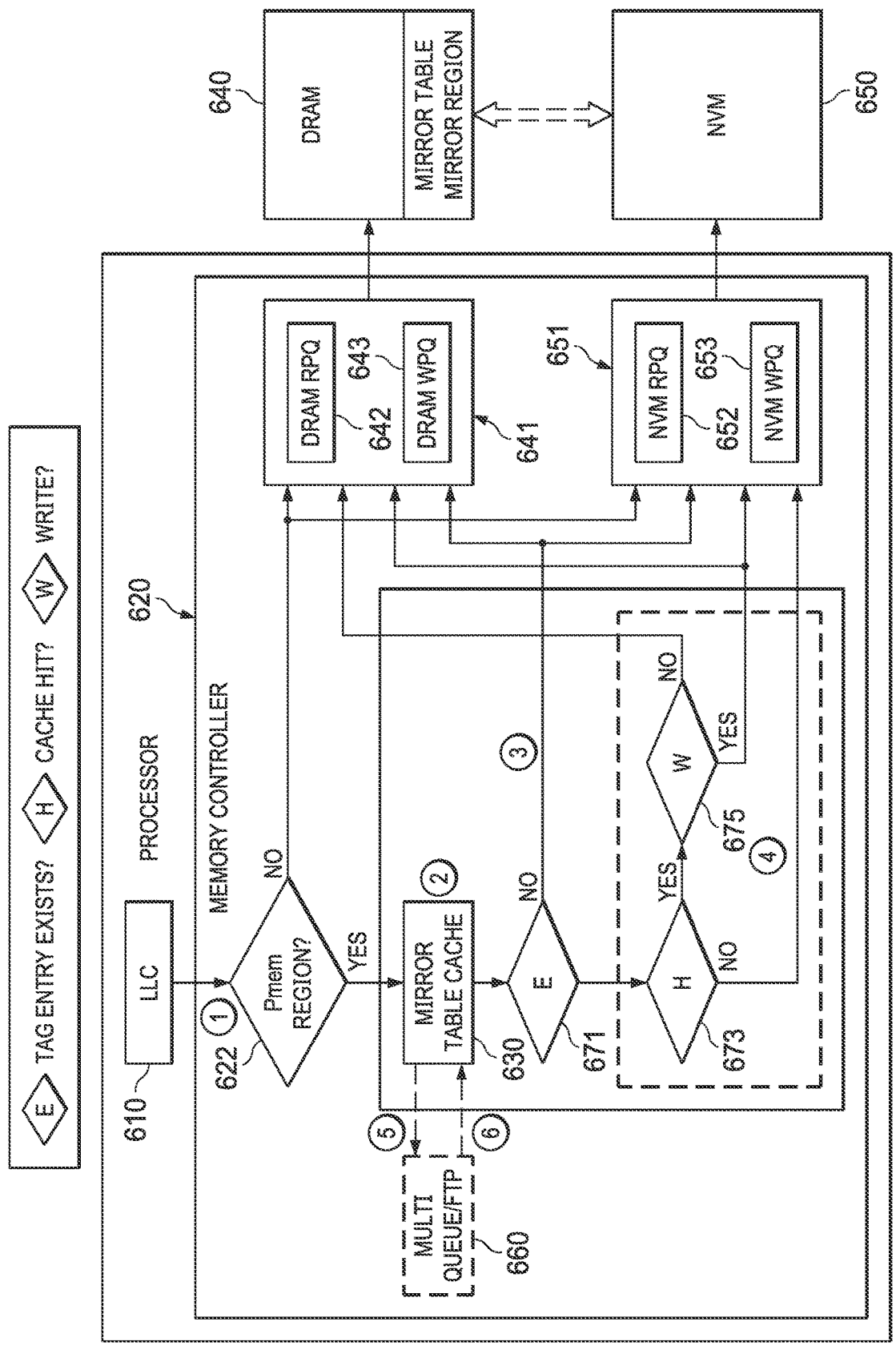
FIG. 6 is an illustration of a block diagram of a stealth-persist overall design in accordance with an illustrative embodiment.

The overall Stealth-Persist design is shown in FIG. 6. For every last level cache (LLC) 610 miss, first the memory controller 620 checks at Pmem REGION? 622 (persistent memory region?) if the request is to the persistent region or not ①. If the request is to the persistent region, the mirror table cache 630 is queried for the current status of the NVM page ②. As discussed in the Stealth-Persist Design, DRAM Mirror Region Lookup section, after determining at E 671 (tag entry exists?), the mirror table cache verifies the mirroring status of the NVM's page by either looking into the already cached mirror table entries, or by fetching the entries from the mirror table stored in the DRAM 640, and replacing a group ID and the respective mapping table entry using a LRU (least recently used) policy ③. DRAM 640 is accessed via DRAM queues 641. DRAM queues 641 includes DRAM RPQ 642 (dynamic random access memory read persist queue) and DRAM WPQ 643 (dynamic random access memory write persist queue).

If the page is mirrored, as determined at H 673 (cache hit?), then at W 675 (write?) read requests are forwarded to the DRAM while write requests are forwarded to both the DRAM, to update the mirroring region, and to the NVM 650, to persist the data ④. NVM 650 is accessed via NVM queues 651. NVM queues 651 includes NVM RPQ 652 (non-volatile memory read persist queue) and NVM WPQ 653 (non-volatile write persist queue). In the case of a read, the persistent memory access is forwarded to the multi-queue or FTP unit 660 ⑤. This multi-queue or FTP unit decides if a page should be mirrored and if so, the mirror table cache is triggered to replace one of the mappings using the LRU policy ⑥

In alternative embodiments, the memory access can be allowed to bypass the mirror region and access the NVM data. For example, the memory controller hub can be permitted to, when a plurality of pages is cached in the mirror region of the dynamic random access memory but the dynamic random access memory resources are pressured, bypass the mirror region and access the plurality of pages using bank level parallelism in the non-volatile memory. This situation could arise when the DRAM bandwidth is exhausted and better performance could be gained by accessing the page in NVM rather than the mirror region in DRAM; the memory controller can then selectively direct accesses to either the DRAM mirror region or the NVM based on its view of bank conflicts in the DRAM. Thus, in an alternative embodiment, the memory controller hub is configured to, when a read from a memory block is cached in the mirror region of the dynamic random access memory and pressure at the dynamic random access memory reaches or is above a threshold, bypass the mirror region of the dynamic random access memory and accessing the read in the non-volatile memory. The threshold can be based on sensing bandwidth exhaustion, buffer slowness, excessive latency, or other pressure.

Stealth-Persist Versus NVM Libraries

Several studies proposed the use of NVM libraries to address atomicity, crash consistency, and performance issues when NVMs are used as a main memory. NVM libraries focus on moving writes out of the critical path to improve the performance, but do not reduce read latency. In contrast, Stealth-Persist improves the performance by reducing the latency of the basic memory read operations, which is still required with NVM libraries. Some schemes focus on fault tolerance, performance and strong consistency, programming effort reduction and performance. While such schemes improve the system's performance by moving the writes overhead out of the application's critical path, or by buffering some of the updates in the DRAM, the writes to the NVM are inevitable if persistency is required. In contrast, Stealth-Persist propagates the writes to the NVM if they are directed towards a persistent region within the NVM, and buffers the writes to the non-persistent region in their DRAM cached pages. Additionally, Stealth-Persist operates in a different layer than the proposed NVM libraries, which makes Stealth-Persist orthogonal to such schemes. As a matter of fact, Stealth-Persist can be used concurrently with the mentioned schemes to improve the performance even further.

Methodology

Embodiments of this disclosure modeled Stealth-Persist in the Structural Simulation Toolkit (SST) simulator. SST is a cycle-level event-based simulator with modular designs for different hardware components. SST is widely used in the industry and academia. Embodiments of this disclosure implemented a hybrid memory controller component to handle both DRAM and NVM. Stealth-Persist required components, Mirroring-Table and the MQ are modeled in a hybrid memory controller module to perform all the relevant tasks. The configuration of the simulated system is shown in Table II. The simulated system contains 4 out-of-order cores with each core executing 2 instructions per cycle. The frequency of the cores is 2 GHz. Three levels of caches, L1, L2, and L3 (inclusive) are simulated with sizes 32 KB, 256 KB, and 1 MB, respectively. The DRAM capacity is 1 GB and the NVM capacity is 4 GB. Note that the selected sizes of DRAM and NVM are chosen due to the limitation of simulation speed, however, the most important parameters are the mirroring region size (32 MB) and the average footprint of the applications (256 MB). Since all the data of persistent applications will reside in NVM and can be cached persistently in the mirroring region, it is useful to focus on the ratio of application's footprint to the mirroring region (8:1 ratio), which is varied later in the paper. NVM read and write latencies are 150 ns and 500 ns.

TABLE II

Configuration of the simulated system

Processing Element

| | |
|---|---|
| Processor | 4 Cores, X86-64, Out-of-Order, 2.00 GHz, 2 issues/cycles, 32 max. outstanding requests. |
| L1 Cache | Private, 4 Cycles, 32 KB, 8-Way |
| L2 Cache | Private, 6 Cycles, 256 KB, 8-Way |
| L3 Cache | Shared, 12 Cycles, 1 MB/core, 16-Way |
| Cacheline Size | 64 Byte |

Hybrid Main Memory

| | |
|---|---|
| DRAM | Size: 1 GB, RCD = RP = 14, CL = 14 CL_WR = 12 |
| NVM | Size: 4 GB, Read latency 150 ns, Write latency 500 ns |

DRAM Mirror

| | |
|---|---|
| Size | 32 MB |
| MQ mirroring threshold level | 4 |
| Epoch interval | 10000 reads |
| Mirroring Table cache | size: 128 entries (groups), associativity: 4, latency: 1 cycle |

Workloads:

To evaluate embodiments of this disclosure 11 persistent applications were run. As shown in Table III, six of the benchmarks were developed in-house, all of which are designed to stress memory usage and were used in previous work. The functionality of each of these applications is described as follows.

❶ ARSWP: This benchmark randomly chooses two keys from the database and swaps them.

❷ RANDWR: Random keys are chosen and the database entry with the chosen key is updated with a random value.

❸ SEQWR: This is similar to RANDWR, but the keys are chosen sequentially starting from the 1st element of the database.

❹ AVL: The database is mapped to an AVL tree and a randomly generated key is searched in the mapped database. If the key is not found an insertion operation is triggered.

❺ BTREE: This benchmark maps the database to a B-tree and similar to AVL, a random key is searched, if not found the key is inserted with dummy data.

❻ RBTREE: Similar to AVL and BTREE benchmarks, RBTREE benchmark maps the database to an RB-tree and a random key is searched.

Five benchmarks were run from the WHISPER benchmark suite (preceded by W: in Table III) developed by the University of Wisconsin-Madison in collaboration with HP Labs. The TPCC benchmark measures the performance of online transaction processing systems (OLTP) based on a complex database and various database transactions that are executed on it. The Yahoo Cloud Serving Benchmark (YCSB) is a programming suite to evaluate database management systems. W:TPCC and W:YCSB benchmarks are variants of the Whisper benchmark suite that are modeled after N-Store, which is a remote data base management system for persistent memory. W:CTREE and W:HASH-MAP benchmarks were developed using the NVML library which performs insert, delete, and get operations to the persistent memory regions. W:ECHO is a scalable key-value store for persistent memory regions. Map_get functionality is evaluated for W:CTREE and W:HASHMAP benchmarks.

The key size of all these benchmarks is 512 bits and the database size is 1 GB. Before evaluating these benchmarks, first the database is filled with random keys. Misses per kilo instructions (MPKI) for these benchmarks are shown in Table III. Each benchmark is evaluated for 500M instructions.

TABLE III

Benchmarks description

| Benchmark | Description | MPKI |
|---|---|---|
| ARSWP | Swap random elements of an array | 31.11 |
| RANDRW | Random updates to persistent memory | 32.43 |
| SEQRW | Sequential updates to persistent memory | 6.18 |
| AVL | Insert and look up random elements in avl tree | 30.38 |
| BTREE | Insert and look up random elements in b-tree | 21.01 |
| RBTREE | Insert and look up random elements in red-black tree | 56.11 |
| W:YCSB | N-Store variant to evaluates database management systems | 3.88 |
| W:TPCC | N-Store variant to measures the performance of online transactions | 3.97 |
| W:CTREE | NVML variant of crit-bit tree | 1.75 |
| W:HASHMAP | Hashmap implemented with NVML library | 0.84 |
| W:ECHO | Scalable key-value store for persistent memory | 9.54 |

DRAM Mirror Configuration:

To mirror the NVM's data, a 32 MB of the DRAM is used. However, embodiments of this disclosure can vary the size of the mirroring region from 2 MB to 1 GB (entire DRAM is used as mirroring region) as discussed in the Sensitivity analysis section below. Mirroring is done at page granularity. In MQ mechanism a page is mirrored only when it reaches MQ level 4, i.e., when a page is read 16 times. The epoch interval is set to 10000 read operations. Although embodiments of this disclosure were evaluated with the above-mentioned configurations (embodiments of this disclosure used CLWB to persist the data and keep the data in the processor caches), sensitivity analysis was performed by varying the DRAM mirror size, and threshold level. Mirror table cache size maintained by the memory controller is 128 groups with each group having 6 mappings. Mirror table cache lookup latency is 1 ns.

Evaluation

This section discusses the results of Stealth-Persist against a system using the NVM directly for persistency. This section further shows sensitivity analysis by varying different parameters that impact the performance.

Impact of Stealth-Persist on Performance

Figure 7:
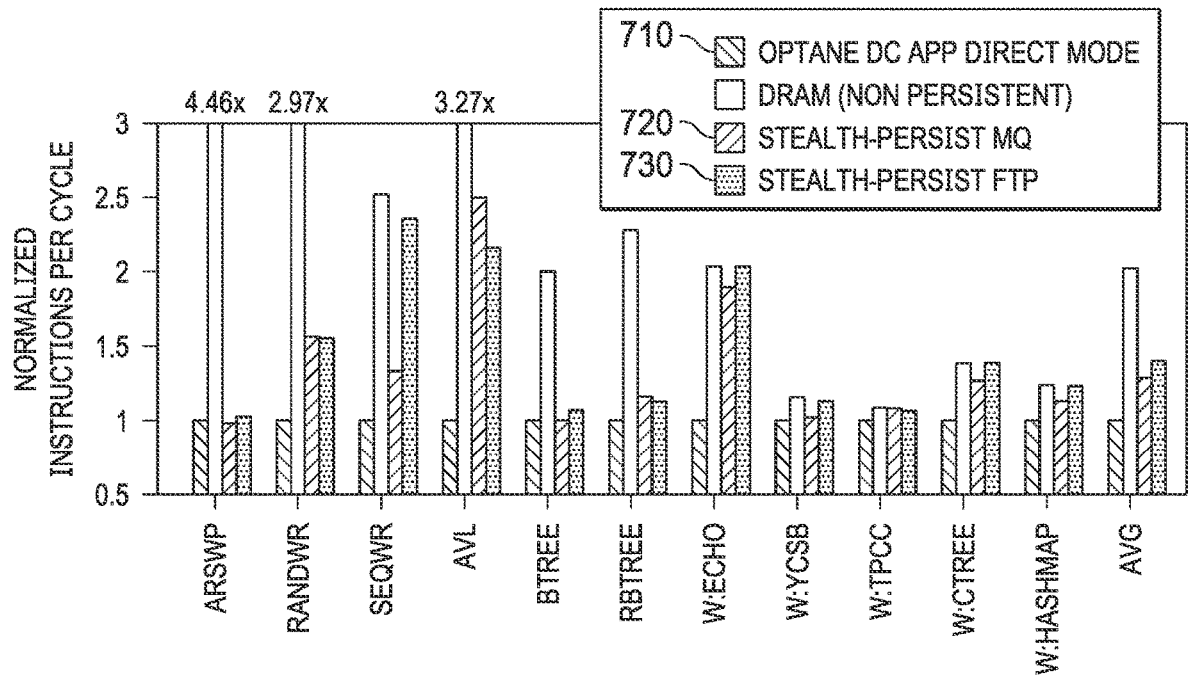
FIG. 7 is an illustration of normalized performance improvement of stealth-persist methods compared to Optane DC app direct move in accordance with an illustrative embodiment.

FIG. 7 shows the performance improvement with Stealth-Persist methods. The baseline scheme is the Optane DC app direct mode 710 scheme wherein all the persistent memory requests are stored to the persistent memory (NVM) only. This is the typical way of achieving data persistency for persistent applications for such systems. On average, the performance improves by 30.9% and 42.02% with Stealth-Persist MQ 720 and Stealth-Persist FTP 730 approaches. The application's performance improvement is a function of the mirroring region's hit rate as discussed in the DRAM Mirror Hit Rate section below. Improvement with Stealth-Persist FTP is higher than Stealth-Persist MQ method since every page that is read is mirrored in the DRAM, which leads to a huge number of pages copied from NVM to DRAM. On average, Stealth-Persist FTP mirrors 542.96× more pages than Stealth-Persist MQ approach, which significantly increases the memory bus traffic and energy use. For sequential memory access benchmarks like SEQWR and W:ECHO, the improvement with Stealth-Persist FTP is substantial –2.34× and 2.2×, respectively. Since such benchmarks access the memory sequentially, the spatial locality for these benchmarks is high. Hence, when a page is read, it is mirrored immediately in Stealth-Persist FTP and is accessed for the contiguous memory accesses. On the other hand, Stealth-Persist MQ approach, first, the page should reach a threshold to be mirrored. For AVL and RBTREE workloads, Stealth-Persist MQ approach outperform Stealth-Persist FTP because Stealth-Persist FTP replaces the pages in the mirroring region very frequently, which leads to evicting hot pages from the mirroring region. On the other hand, Stealth-Persist MQ approach tends to keep hot pages in the mirroring region.

For the ARSWP workload, the performance of Stealth-Persist scheme barely changes compared to Optane DC app direct mode and, from FIG. 3, it suffers significantly compared to a system using DRAM as main memory—it is 4.39× slower. However, the ARSWP application memory accesses are very sparse, and thus the reuse distance of the pages are high, which leads to evicting those pages in Stealth-Persist FTP approach before they are reused. Additionally, the pages of the ARSWP application do not reach the mirroring limit for Stealth-Persist MQ approach. Hence, the performance degrades by 3% in MQ approach due to checking the mirror region while having only 0.02% hit rate. On the other hand, Stealth-Persist FTP performance improves by 1.6% for ARSWP benchmark due to having 3% hit rate. However, the performance of ARSWP improves when the mirroring region size is increased, as shown in the Sensitivity analysis—Impact of Mirroring Region on Performance section below.

DRAM Mirror Hit Rate

Figure 8:
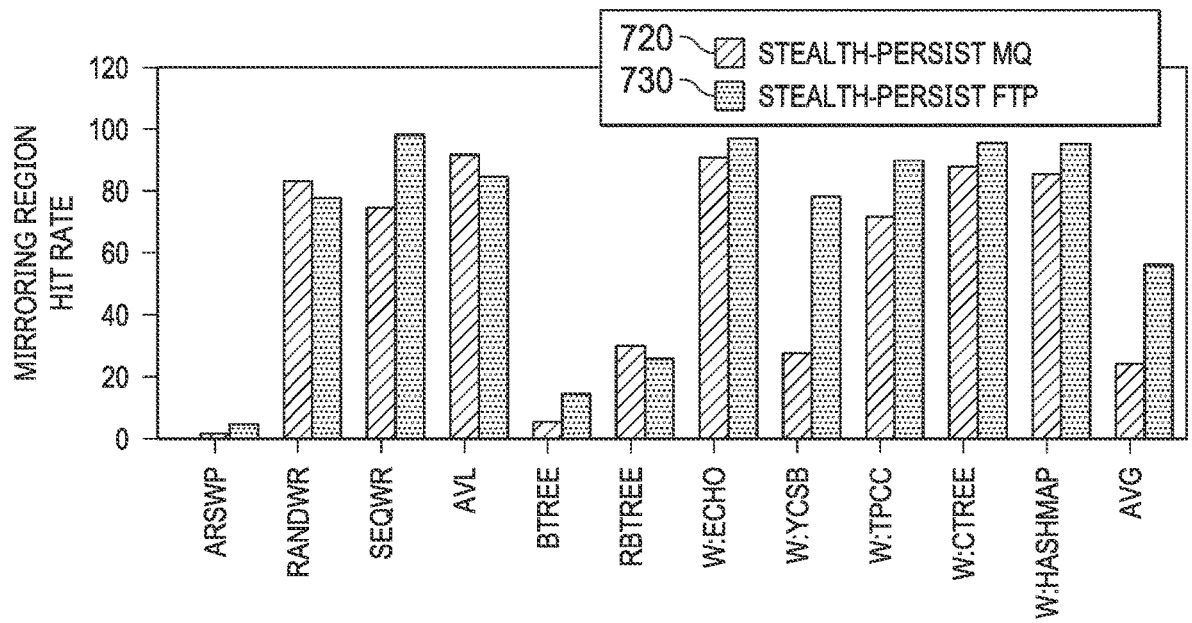
FIG. 8 is an illustration of percentage of request served by the mirroring region in accordance with an illustrative embodiment.

FIG. 8 shows the percentage of reads served by the DRAM mirroring region. Applications with sequential memory accesses show the best performance improvement—FTP is showing a very high hit rate for these applications. On the other hand, applications with random stride accesses and ones with hot pages, show the highest hit rates in Stealth-Persist MQ 720 approach. As FIG. 8 illustrates, the mirrored pages serve an average of 57.81% of the overall memory reads in Stealth-Persist FTP 730 approach. For Stealth-Persist MQ, it serves an average of 24.78% of the overall reads with a reasonable number of page mirrors compared to Stealth-Persist FTP. As shown in FIG. 8, memory bounded applications with the highest hit rates show the highest performance improvement. In Stealth-Persist FTP, the mirroring hit rate for WHISPER benchmarks, like CTREE and HASHMAP is high, but the performance improvement is not as much as for SEQWR and ECHO benchmarks. This is because CTREE and HASHMAP applications are not as memory intensive as EPOCH and SEQWR, which is correlated with the MPKI for CTREE and HASHMAP, as shown in Table III—CTREE has an MPKI of 1.75 and HASHMAP has an MPKI of 0.84.

Impact of Stealth-Persist on NVM Reads

Figure 9:
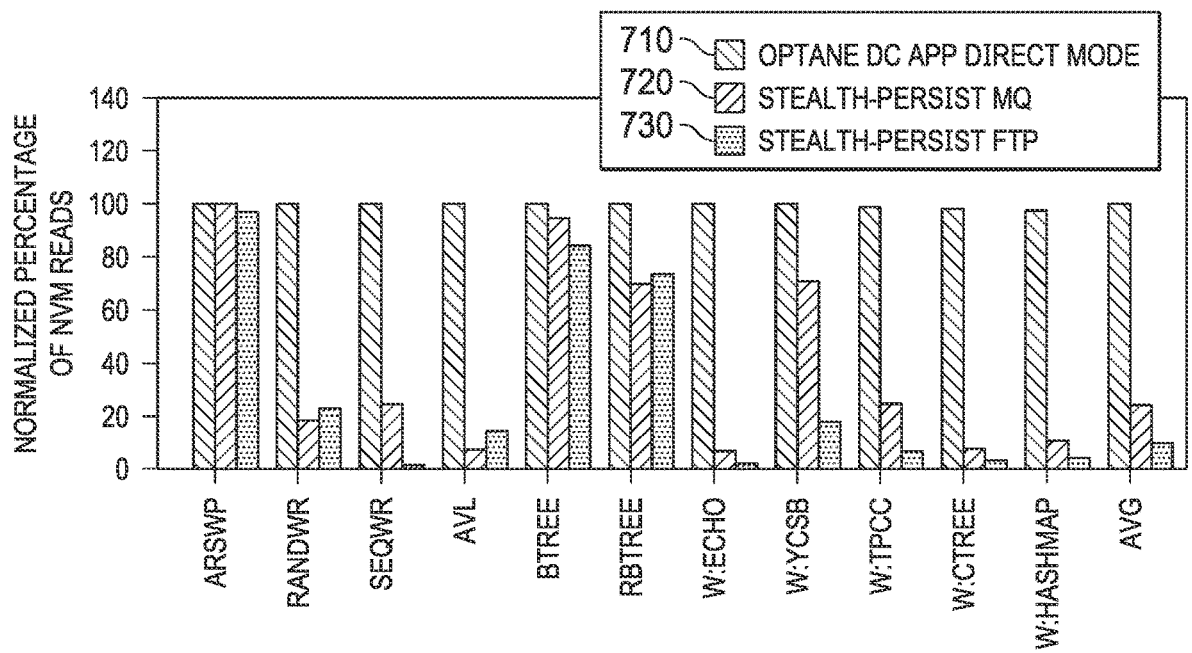
FIG. 9 is an illustration of percentage of reads served by NVM with Stealth-Persist methods compared to Optane DC app direct mode in accordance with an illustrative embodiment.

In this section, the reduction in the number of reads sent to the NVM using Stealth-Persist approaches is shown. When the mirroring region hit rate is high, most of the reads are served by the mirroring region, which reduces the number of reads sent to the NVM. FIG. 9 shows that, on average, the number of NVM reads are reduced by 88.28% and 73.28% with Stealth-Persist FTP 720 and Stealth-Persist MQ 730 approaches, with respect to Optane DC app direct mode 710 (100%). For the SEQWR and W:ECHO benchmarks, which show the highest performance improvement with Stealth-Persist FTP, NVM reads are significantly reduced by 98.42% and 98.02%, respectively.

Impact of Stealth-Persist on NVM Writes

Figure 10:
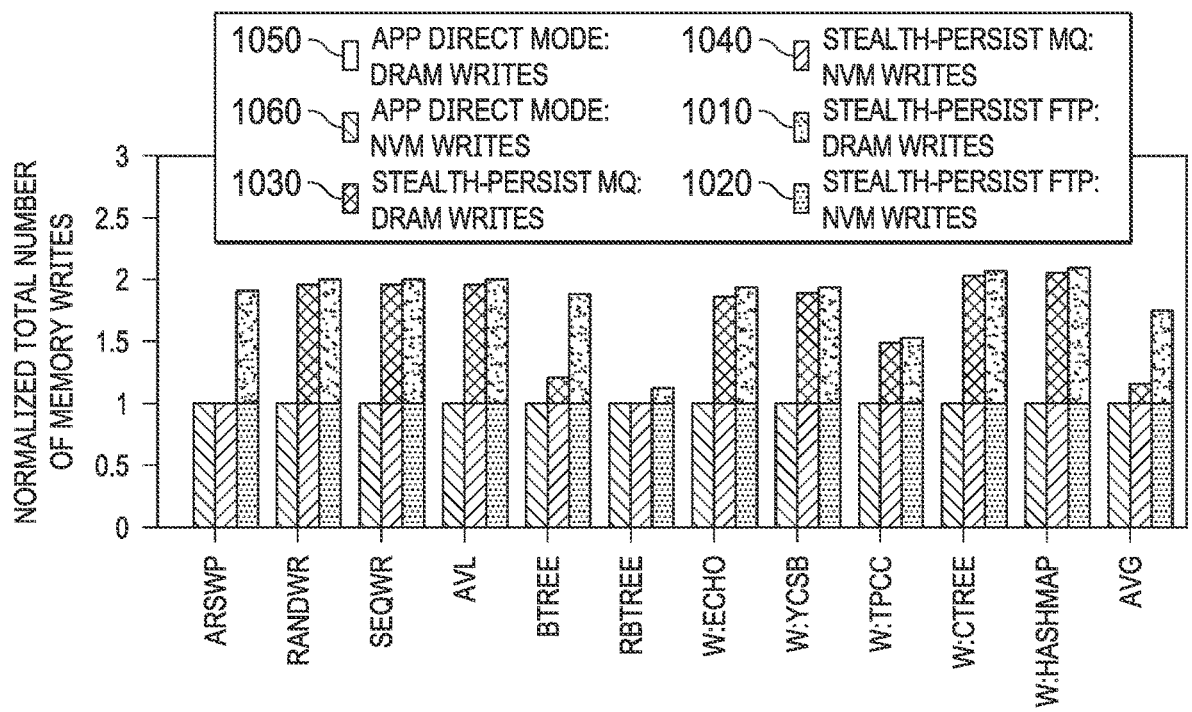
FIG. 10 is an illustration of number of writes to DRAM and NVM with Stealth-Persist methods compared to Optane DC app direct mode normalized to NVM writes in accordance with an illustrative embodiment.

As FIG. 10 shows, Stealth-Persist schemes do not have any impact on the number of writes to the NVM. However, Stealth-Persist sends the writes of the mirrored pages to the DRAM as well. Therefore, Stealth-Persist does not affect the NVM's write endurance nor increase the energy consumption, which might be caused by increasing the NVM writes.

Sensitivity Analysis

Although Stealth-Persist FTP 1010, 1020 and Stealth-Persist MQ 1030, 1040 improve the performance by 42.02% and 30.9% on average compared to the baseline (Optane DC app direct mode 1050, 1060), there is still a room for improvement since the mirroring region hit rate is 57.81% and 24.78%, on average. Misses can happen for many reasons, but are mainly affected by the mirroring region size and mirroring threshold in Stealth-Persist design. However, increasing the mirroring region size will increase the hardware complexity (Mirroring-Table size) while reducing the mirroring threshold may result in early replacement of required pages, which may degrade the overall performance. To fully analyze the effects of the mirroring region size and the mirroring threshold, variation of the mirroring region size and the mirroring threshold is described in this section. Also, the performance improvement on fast and slow NVMs is described in this section. The average of all the workloads is shown in the sensitivity results.

Impact of Mirroring Region on Performance

The number of persistent pages that can be mirrored in the DRAM is dependent on the percentage of the DRAM memory reserved for mirroring. To avoid significant memory overhead, Stealth-Persist reserves only 32 MB of the DRAM, which is 3.125% of the DRAM in the simulated system, for mirroring of persistent memory pages. However, as discussed previously, the more pages that can be mirrored, the greater the upper bound on system performance when using Stealth-Persist. Variation of the mirroring region size from 2 MB to 1 GB facilitates evaluation of performance improvements with Stealth-Persist. Note that when the mirroring region size is 1 GB, the entire DRAM is reserved to cache mirroring pages.

Figure 11:
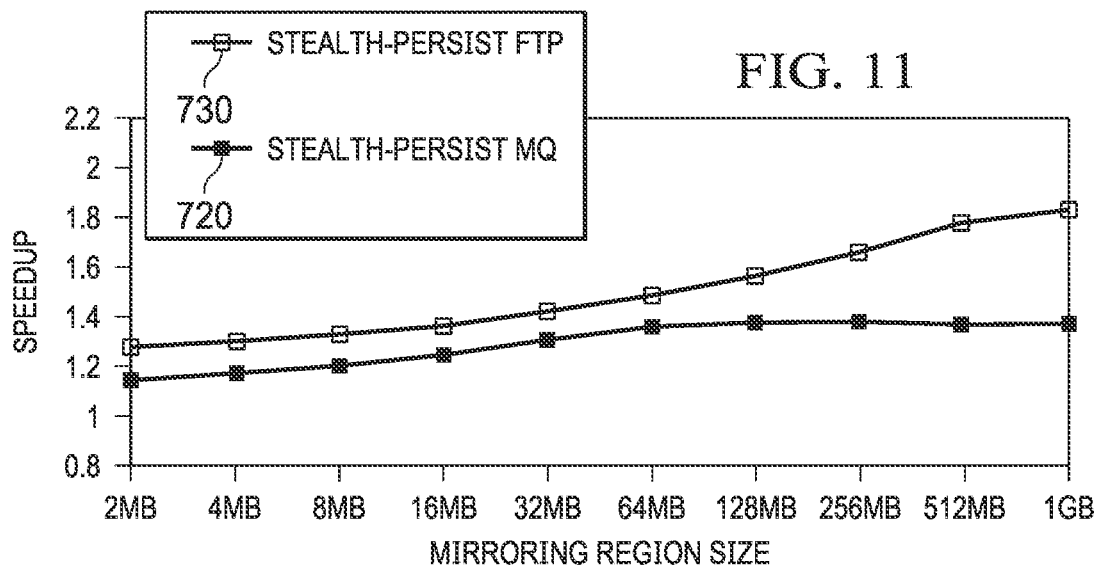
FIG. 11 is an illustration of performance improvement with different mirroring region sizes in accordance with an illustrative embodiment.

FIG. 11 shows that increasing the mirroring region size improves the performance of both Stealth-Persist FTP 730 and Stealth-Persist MQ 720. As the mirroring region size increases from 2 MB to 1 GB, the performance improvement increases from 1.28× to 1.83× with Stealth-Persist FTP and increases from 1.14× to 1.38× with Stealth-Persist MQ. The improvement is saturated after 64 MB mirroring region size with Stealth-Persist MQ since MQ is a confirmation based approach wherein a NVM page is mirrored only if it is accessed for more than the threshold number of times (4). Hence, even though the mirroring region size is increased, the number of pages to mirror is bounded by the threshold and hence performance improvement is saturated. When mirroring region size is 64 MB, the performance improvement with Stealth-Persist FTP is 1.48× and 1.35× with Stealth-Persist MQ. Also, as asserted, ARSWP benchmark which is not showing performance improvement with 32 MB mirroring size, achieves an improvement of 1.06×, 1.22×, 1.75×, 2.65×, and 3.22× when the mirroring region size is 64 MB, 128 MB, 256 MB, 512 MB, and 1 GB with Stealth-Persist FTP, respectively. However, with Stealth-Persist MQ embodiments of this disclosure may have no observable improvement since the pages of the ARSWP application do not reach the mirroring threshold.

Mirroring Threshold Level Impact on Performance

Figure 12:
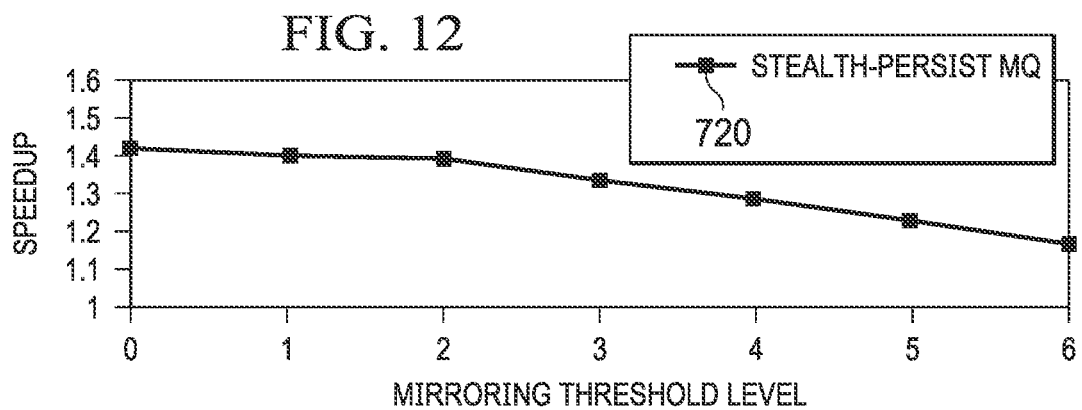
FIG. 12 is an illustration of performance improvement by Stealth-Persist MQ by varying the mirroring threshold level in accordance with an illustrative embodiment.

In FIG. 12, embodiments of this disclosure show the results when varying the mirroring threshold queue level. When the threshold level is decreased, the performance improvement with Stealth-Persist MQ 720 approach is increased. Embodiments of this disclosure can provide a performance improvement of 1.46× when the threshold level is set to 1 and, with a threshold level of 4, the performance improvement is 1.3×. Stealth-Persist behaves aggressively when the threshold level is reduced since more pages are identified as mirroring candidates. That is, when the threshold level is 1, a page is identified as a mirroring candidate if the application reads the page at least 2 times. But, when the threshold level is 4, a page is mirrored only if it is read a minimum of 16 times. Hence, the performance improvement achieved by reducing the threshold level is at the cost of increasing the number of pages to mirror.

On the other hand, increasing the threshold level can hurt the performance improvement due to two reasons. 1) A page is mirrored after reaching the threshold level, as the queue level increases, and the application has to access the page more frequently to be identified as a mirroring candidate. In general, the percentage of these pages is small, and they are often cached in the processor. 2) The hotness of the page is lost after reaching the threshold level. For instance, if the threshold level is set to 6, a page has to be accessed for a minimum of 64 times to be mirrored. However, after accessing the page for 64 times, the application may no longer need access to this page, negating the impact of mirroring.

Impact of NVM Read/Write Latency on Performance

Figure 13:
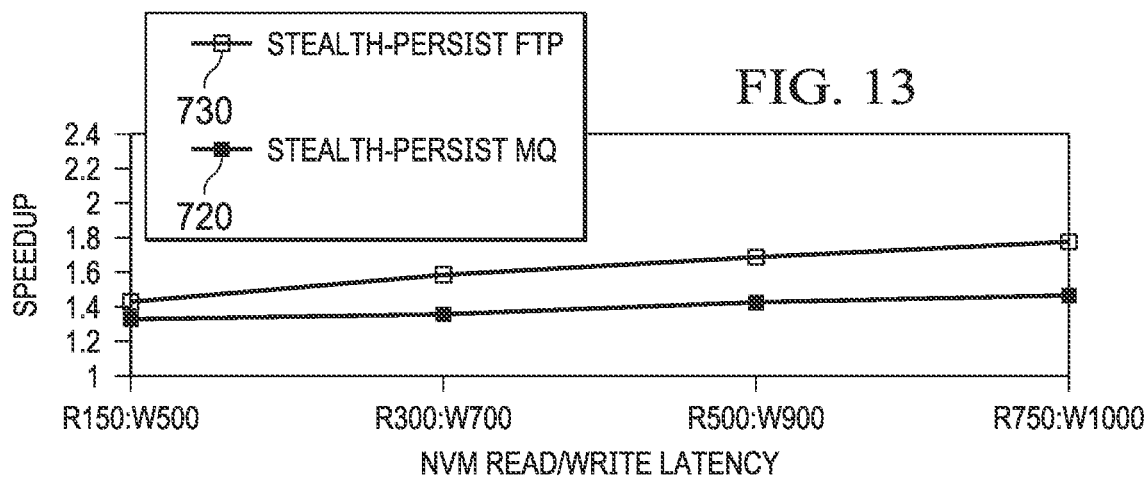
FIG. 13 is an illustration of performance improvement with Stealth-Persist for different NVM's read/write latencies compared to Optane DC app direct mode respectively in accordance with an illustrative embodiment.

Although the NVM's read latency is comparable to the DRAM's read latency, it is still slower than the read latency of the DRAM. The write latency of the NVM suffers significantly compared to the DRAM. NVM's read/write latencies are critical while mirroring pages from the NVM to the DRAM. The impact of Stealth-Persist for slow and fast NVM's read/write latencies can be studied. Embodiments of this disclosure varied the NVM's read and write latencies as shown in FIG. 13. FIG. 13 categorizes the NVM into 4 types—moderate: read and write latencies are 150 ns and 500 ns, slow: read and write latencies are 300 ns and 700 ns, very slow: read and write latencies are 500 ns and 900 ns and ultra slow: read and write latencies are 750 and 1000 ns. As the NVM's read/write latencies increase the performance improvement also increases with Stealth-Persist. With ultra-slow NVM, Stealth-Persist improves the performance by 1.87× and 1.54× with Stealth-Persist FTP 730 and Stealth-Persist MQ 720, respectively.

Improving the performance of persistent applications in hybrid memory systems requires caching the NVM resident data in the DRAM. However, caching the persistent application's data in the DRAM nullifies the persistency of those cached pages. Ensuring the persistency of DRAM cached pages can be achieved by power-backing the DRAM. However, using batteries to power-back the DRAM is expensive, unreliable, incompatible with legacy systems, and is not environmentally friendly. Therefore, embodiments of this disclosure can include Stealth-Persist, a novel memory controller design that allows caching the NVM resident pages in the DRAM while ensuring the pages' persistency. By serving NVM requests from DRAM, Stealth-Persist exploits bank-level parallelism which reduces the memory contention and brings in additional performance gains. Stealth-Persist improves the system performance of persistent applications in hybrid memory systems by 42.02% on average with Stealth-Persist FTP. However, Stealth-Persist FTP requires a significant number of pages to be copied from the NVM to DRAM. With Stealth-Persist MQ approach, embodiments of this disclosure can show a performance improvement of 30.09% with reasonable page mirrors. Stealth-Persist achieves this improvement at the cost of small hardware managed table, a small cache in the memory controller, and by utilizing the WPQ.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of architectural support of hybrid memory system persistent applications, the method comprising:
caching at least a fraction of data stored in a non-volatile memory in a mirror region of a dynamic random access memory, the dynamic random access memory comprising a mirror mapping table comprising a hardware managed table,
wherein a memory controller hub of a processor chip coupled to both the non-volatile memory and the dynamic random access memory is configured to, when a first update to the dynamic random access memory is cached in the mirror region of the dynamic random access memory, using the memory controller hub to both write the update directly to the mirror region of the dynamic random access memory and concurrently mirror the update to the non-volatile memory providing coherent persistent durability of the update,
wherein the hardware managed table includes for each mirrored page a group ID, a TAG (non-volatile memory page address) and a dynamic random access memory address.

2. The method of claim 1, when a read from the dynamic random access memory is cached in the mirror region of the dynamic random access memory, using the memory controller hub to serve the read directly from the mirror region of the dynamic random access memory.

3. The method of claim 1, when a second update to the dynamic random access memory is not cached in the mirror region of the dynamic random access memory, not concurrently mirroring the update to the non-volatile memory.

4. The method of claim 1, wherein the memory controller hub supports both memory mode and application direct mode.

5. The method of claim 1, wherein the memory controller hub transparently ensures durability of updates to persistent pages that are also cached in DRAM.

6. The method of claim 1, wherein the memory controller hub is configured to, when a read from a memory block is cached in the mirror region of the dynamic random access memory and pressure at the dynamic random access memory is above a threshold, bypassing the mirror region of the dynamic random access memory and accessing the read in the non-volatile memory.

7. The method of claim 1, wherein the memory controller hub is configured to, when a plurality of pages is cached in the mirror region of the dynamic random access memory, access the plurality of pages in the dynamic random access memory using bank level parallelism, instead of accesses to the non-volatile memory.

8. The method of claim 1, wherein the memory controller hub is configured to implement multi-queue page eviction based on a least recently used algorithm wherein, when a threshold to be mirrored is reached, M least recently used queues of block descriptors are defined wherein each descriptor comprises a block number, a reference counter and a logical expiration time, wherein a page is cached in the mirror region of the dynamic random access memory using the memory controller hub to both write the page directly to the mirror region of the dynamic random access memory and concurrently mirror the page to the non-volatile memory, to keep hot pages in the mirror region of the dynamic random access memory.

9. A method of architectural support of hybrid memory system persistent applications, the method comprising:
caching at least a fraction of data stored in a non-volatile memory in a mirror region of a dynamic random access memory,
wherein a memory controller hub of a processor chip coupled to both the non-volatile memory and the dynamic random access memory is configured to, when an update to the dynamic random access memory is cached in the mirror region of the dynamic random access memory, using the memory controller hub to both write the update directly to the mirror region of the dynamic random access memory and concurrently mirror the update to the non-volatile memory to provide coherent persistent durability of the update,
wherein a mirror mapping table of the dynamic random access memory comprises a hardware managed table including for each mirrored page a group ID, a TAG (non-volatile memory page address) and a dynamic random access memory address.

10. An apparatus for architectural support of hybrid memory system persistent applications, the apparatus comprising:
a processor chip comprising a core, a cache, and a memory controller hub;
a non-volatile memory coupled to the processor chip; and
a dynamic random access memory coupled to the processor chip, the dynamic random access memory comprising a mirror mapping table comprising a hardware managed table, and a mirror region,
wherein the dynamic random access memory caches at least fraction of data stored in the non-volatile memory in the mirror region of the dynamic random access memory,
wherein the memory controller hub is configured to, when a first update to the dynamic random access memory is cached in the mirror region of the dynamic random access memory, using the memory controller hub to both write the update directly to the mirror region of the dynamic random access memory and concurrently mirror the update to the non-volatile memory providing coherent persistent durability of the update,
wherein the hardware managed table includes for each mirrored page a group ID, a TAG (non-volatile memory page address) and a dynamic random access memory address.

11. The apparatus of claim 10, when a read from the dynamic random access memory is cached in the mirror region of the dynamic random access memory, using the memory controller hub to serve the read directly from the mirror region of the dynamic random access memory.

12. The apparatus of claim 10, when a second update to the dynamic random access memory is not cached in the mirror region of the dynamic random access memory, not concurrently mirroring the update to the non-volatile memory.

13. The apparatus of claim 10, wherein the memory controller hub supports both memory mode and application direct mode.

14. The apparatus of claim 10, wherein the memory controller hub transparently ensures durability of updates to persistent pages that are also cached in DRAM.

15. The apparatus of claim 10, wherein the memory controller hub is configured to, when a read from a memory block is cached in the mirror region of the dynamic random access memory and pressure at the dynamic random access memory is above a threshold, bypassing the mirror region of the dynamic random access memory and accessing the read in the non-volatile memory.

16. The apparatus of claim 10, wherein the memory controller hub is configured to, when a plurality of pages is cached in the mirror region of the dynamic random access memory, access the plurality of pages in the dynamic random access memory using bank level parallelism, instead of accesses to the non-volatile memory.

17. The apparatus of claim 10, wherein the memory controller hub is configured to implement multi-queue page eviction based on a least recently used algorithm wherein, when a threshold to be mirrored is reached, M least recently used queues of block descriptors are defined wherein each descriptor comprises a block number, a reference counter and a logical expiration time, wherein a page is cached in the mirror region of the dynamic random access memory using the memory controller hub to both write the page directly to the mirror region of the dynamic random access memory and concurrently mirror the page to the non-volatile memory, to keep hot pages in the mirror region of the dynamic random access memory.

18. An apparatus for architectural support of hybrid memory system persistent applications, the apparatus comprising:
   a processor chip comprising a core, a cache, and a memory controller hub;
   a non-volatile memory coupled to the processor chip; and
   a dynamic random access memory coupled to the processor chip, the dynamic random access memory comprising a mirror mapping table and a mirror region,
   wherein the dynamic random access memory caches at least fraction of data stored in the non-volatile memory in the mirror region of the dynamic random access memory,
   wherein the memory controller hub is configured to, when an update to the dynamic random access memory is cached in the mirror region of the dynamic random access memory, using the memory controller hub to both write the update directly to the mirror region of the dynamic random access memory and concurrently mirror the update to the non-volatile memory to provide coherent persistent durability of the update,
   wherein the mirror mapping table of the dynamic random access memory comprises a hardware managed table including for each mirrored page a group ID, a TAG (non-volatile memory page address) and a dynamic random access memory address.

19. A computer program product for architectural support of hybrid memory system persistent applications, the computer program product comprising:
   a non-transitory computer readable storage media; and
   program code, stored on the computer readable storage media, for caching at least a fraction of data stored in a non-volatile memory in a mirror region of a dynamic random access memory, the dynamic random access memory comprising a mirror mapping table comprising a hardware managed table,
   wherein a memory controller hub of a processor chip coupled to both the non-volatile memory and the dynamic random access memory is configured to, when an update to the dynamic access random access memory is cached in the mirror region of the dynamic random access memory, use the memory controller hub to both write the update directly to the mirror region of the dynamic random access memory and concurrently mirror the update to the non-volatile memory providing coherent persistent durability of the update,
   wherein the hardware managed table includes for each mirrored page a group ID, a TAG (non-volatile memory page address) and a dynamic random access memory address.

20. The computer program product of claim 19, when a read from the dynamic random access memory is cached in the mirror region of the dynamic random access memory, use the memory controller hub to serve the read directly from the mirror region of the dynamic random access memory.

21. The computer program product of claim 19, when a second update to the dynamic random access memory is not cached in the mirror region of the dynamic random access memory, not concurrently mirroring the update to the non-volatile memory.

22. The computer program product of claim 19, wherein the memory controller hub supports both memory mode and application direct mode.

23. The computer program product of claim 19, wherein the memory controller hub transparently ensures durability of updates to persistent pages that are also cached in DRAM.

24. The computer program product of claim 19, wherein the memory controller hub is configured to, when a read from a memory block is cached in the mirror region of the dynamic random access memory and pressure at the dynamic random access memory is above a threshold, bypassing the mirror region of the dynamic random access memory and accessing the read in the non-volatile memory.

25. The computer program product of claim 19, wherein the memory controller hub is configured to, when a plurality of pages is cached in the mirror region of the dynamic random access memory, access the plurality of pages in the dynamic random access memory using bank level parallelism, instead of accesses to the non-volatile memory.

26. The computer program product of claim 19, wherein the memory controller hub is configured to implement multi-queue page eviction based on a least recently used algorithm wherein, when a threshold to be mirrored is reached, M least recently used queues of block descriptors are defined wherein each descriptor comprises a block number, a reference counter and a logical expiration time, wherein a page is cached in the mirror region of the dynamic random access memory using the memory controller hub to both write the page directly to the mirror region of the dynamic random access memory and concurrently mirror the page to the non-volatile memory, to keep hot pages in the mirror region of the dynamic random access memory.

27. A computer program product for architectural support of hybrid memory system persistent applications, the computer program product comprising:
   a non-transitory computer readable storage media; and
   program code, stored on the computer readable storage media, for caching at least a fraction of data stored in a non-volatile memory in a mirror region of a dynamic random access memory,
   wherein a memory controller hub of a processor chip coupled to both the non-volatile memory and the dynamic random access memory is configured to, when an update to the dynamic random access memory is cached in the mirror region of the dynamic random access memory, use the memory controller hub to both write the update directly to the mirror region of the dynamic random access memory and concurrently mirror the update to the non-volatile memory to provide coherent persistent durability of the update,
   wherein a mirror mapping table of the dynamic random access memory comprises a hardware managed table including for each mirrored page a group ID, a TAG (non-volatile memory page address) and a dynamic random access memory address.

\* \* \* \* \*